United States Patent
Crossman et al.

(10) Patent No.: US 12,545,290 B2
(45) Date of Patent: Feb. 10, 2026

(54) METHOD AND SYSTEM FOR PREDICTING EXTERNAL AGENT BEHAVIOR

(71) Applicant: May Mobility, Inc., Ann Arbor, MI (US)

(72) Inventors: Jacob Crossman, Ann Arbor, MI (US); Kapil Borle, Ann Arbor, MI (US); Timothy Saucer, Ann Arbor, MI (US); Edwin B. Olson, Ann Arbor, MI (US)

(73) Assignee: May Mobility, Inc, Ann Arbor, MI (US)

( * ) Notice: Subject to any disclaimer, the term of this patent is extended or adjusted under 35 U.S.C. 154(b) by 0 days.

(21) Appl. No.: 18/982,386

(22) Filed: Dec. 16, 2024

(65) Prior Publication Data
US 2025/0196884 A1 Jun. 19, 2025

Related U.S. Application Data

(60) Provisional application No. 63/610,249, filed on Dec. 14, 2023.

(51) Int. Cl.
*B60W 60/00* (2020.01)
*G06N 20/20* (2019.01)

(52) U.S. Cl.
CPC .......... *B60W 60/001* (2020.02); *G06N 20/20* (2019.01); *B60W 2554/4029* (2020.02); *B60W 2554/4045* (2020.02)

(58) Field of Classification Search
None
See application file for complete search history.

(56) References Cited

U.S. PATENT DOCUMENTS

| | | | |
|---|---|---|---|
| 9,187,088 B1* | 11/2015 | Ferguson | G06N 20/00 |
| 11,577,722 B1* | 2/2023 | Packer | G05D 1/0088 |
| 2018/0141544 A1* | 5/2018 | Xiao | G01C 21/3469 |
| 2019/0171912 A1* | 6/2019 | Vallespi-Gonzalez | G06N 7/01 |
| 2019/0367021 A1* | 12/2019 | Zhao | G08G 1/161 |
| 2020/0089246 A1* | 3/2020 | McGill, Jr. | G05D 1/0221 |
| 2020/0156632 A1* | 5/2020 | Ding | B60W 30/0956 |
| 2020/0207375 A1* | 7/2020 | Mehta | G05D 1/0088 |
| 2020/0249674 A1* | 8/2020 | Dally | G05D 1/0221 |
| 2021/0061293 A1* | 3/2021 | Bacchus | G06F 18/2415 |
| 2021/0094539 A1* | 4/2021 | Beller | G05D 1/0214 |

(Continued)

FOREIGN PATENT DOCUMENTS

WO 2023114330 A1 6/2023

OTHER PUBLICATIONS

Albrecht, "Interpretable Goal-based Prediction and Planning for Autonomous Driving", Jun. 2021, 2021 IEEE International Conference on Robotics and Automation (Year: 2021).*

(Continued)

*Primary Examiner* — David P. Merlino
(74) *Attorney, Agent, or Firm* — Buckley, Maschoff & TalwalkarLLC

(57) ABSTRACT

A method for predicting external agent behavior can include: receiving decisioning data, identifying a set of environmental agents (e.g., external agents), and evaluating a set of hypotheses for each environmental agent. A system for predicting external agent behavior can include a computing system and a sensor suite (e.g., onboard an autonomous vehicle), which can function to implement any or all of the processes of the method.

9 Claims, 15 Drawing Sheets

(56) References Cited

U.S. PATENT DOCUMENTS

| | | |
|---|---|---|
| 2021/0370980 A1 | 12/2021 | Ramamoorthy et al. |
| 2022/0126864 A1 | 4/2022 | Moustafa et al. |
| 2022/0227367 A1* | 7/2022 | Kario ............... B60W 30/18145 |
| 2022/0382279 A1* | 12/2022 | Wray ................... G05D 1/0088 |
| 2023/0042431 A1* | 2/2023 | Ramamoorthy ........ G06F 17/18 |
| 2023/0162539 A1* | 5/2023 | Li ............................ G06N 7/01 |
| | | 701/23 |
| 2024/0061431 A1* | 2/2024 | Matsumura .......... G05D 1/0214 |
| 2024/0157969 A1* | 5/2024 | Nowak ................ G08G 1/0133 |
| 2024/0202393 A1* | 6/2024 | Dobre ............... B60W 60/0011 |
| 2025/0044106 A1* | 2/2025 | Huynh ............ B60W 30/18154 |

OTHER PUBLICATIONS

Darweesh, et al., "Estimating the Probabilities of Surrounding Vehicles' Intentions and Trajectories using Behavior Planner", International Journal of Automotive Engineering, vol. 10, No. 4 (2019).

* cited by examiner

METHOD AND SYSTEM FOR PREDICTING EXTERNAL AGENT BEHAVIOR

CROSS-REFERENCE TO RELATED APPLICATIONS

This application claims the benefit of U.S. Provisional Application No. 63/610,249 filed 14 Dec. 2023, which is incorporated in its entirety by this reference.

TECHNICAL FIELD

This invention relates generally to the autonomy, transportation, and vehicle fields, and more specifically to a new and useful system and method for predicting external agent behavior in the autonomy, transportation, and vehicle fields.

DETAILED DESCRIPTION

The following description of the embodiments of the invention is not intended to limit the invention to these embodiments, but rather to enable any person skilled in the art to make and use this invention.

1. Overview

Figure 1:
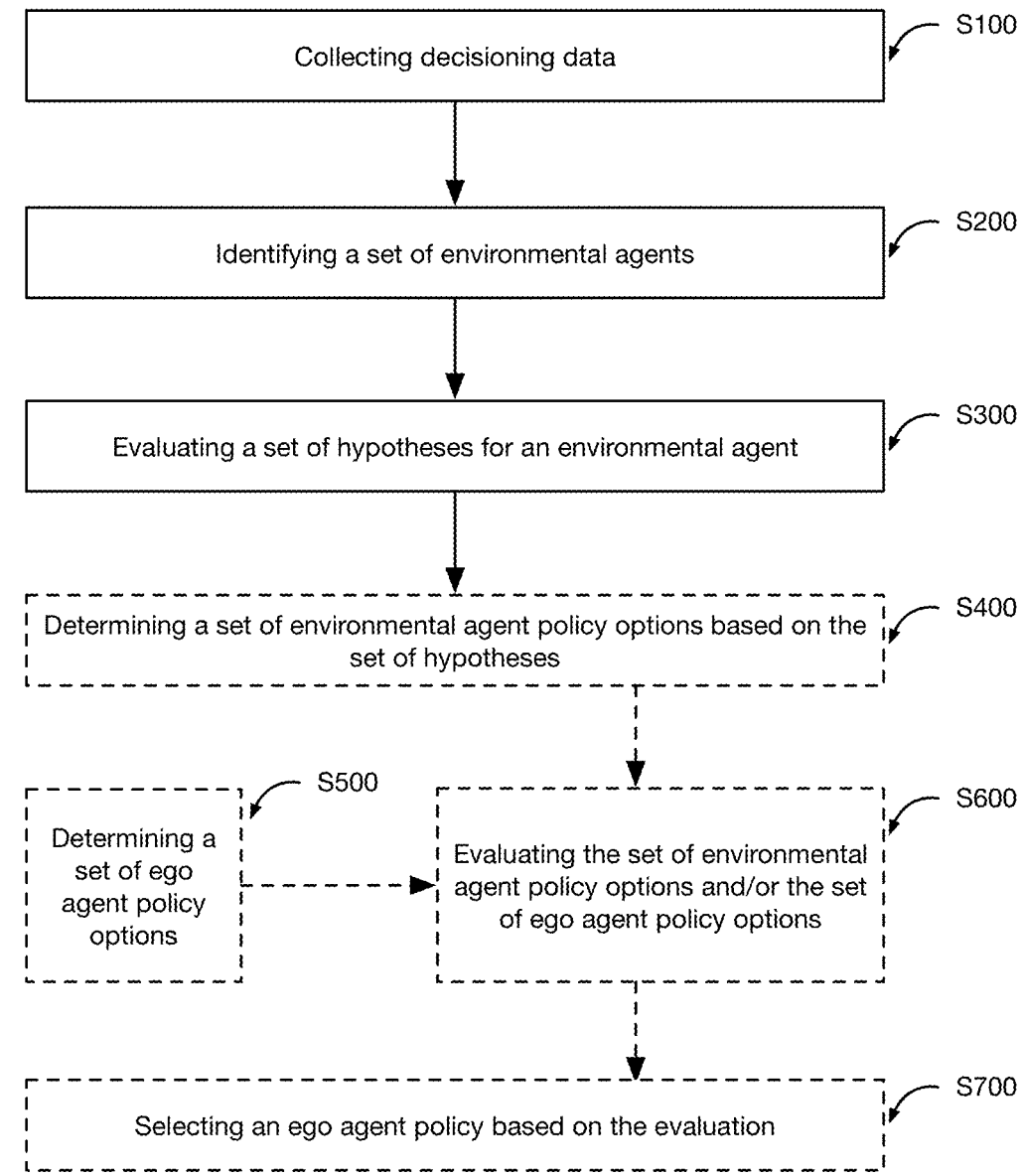
FIG. 1 is a schematic representation of a variant of the method.

As shown in FIG. 1, a method for predicting external agent (e.g., environmental agent) behavior can include: collecting decisioning data S100, identifying a set of environmental agents S200, and evaluating a set of hypotheses for an environmental agent S300. The method can optionally include: determining a set of environmental agent policy options based on the set of hypotheses S400, determining a set of ego agent policy options S500, evaluating the set of environmental agent policy options and/or the set of ego agent policy options S600, selecting an ego agent policy based on the evaluation S700, and/or any other suitable steps. The method 100 can be performed with a system 200 as described below and/or any other suitable system.

Figure 2A:
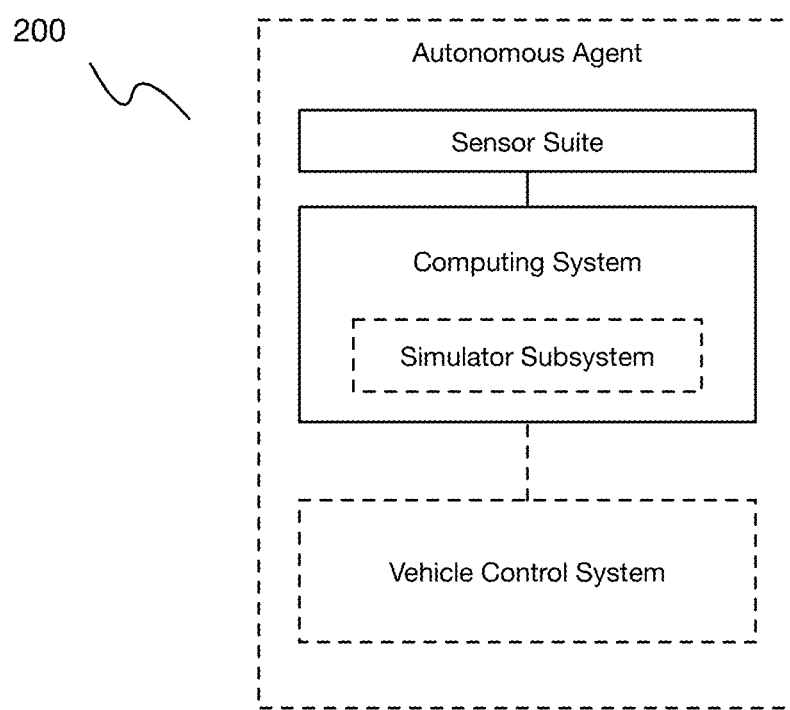
FIG. 2A is a schematic representation of a variant of the system.

As shown in FIG. 2A, a system for predicting external agent (e.g., environmental agent) behavior can include: a computing system and a sensor suite. The system can optionally include and/or interface with (e.g., communicate with, implement, run, etc.): an ego agent (e.g., wherein all or a portion of the computing system is onboard the ego agent), a vehicle control system, a set of infrastructure devices, a communication interface, a teleoperator platform, a tracker, a positioning system, a guidance system, and/or any other suitable components.

In variants, the method 100 and/or system 200 can function to determine one or more environmental agent policies for an environmental agent (e.g., for use in multi-policy decision making simulations), each environmental agent policy associated with a hypothesized state of the environmental agent. Additionally or alternatively, the method 100 and/or system 200 can function to determine an action (e.g., select a policy) for an autonomous agent (e.g., ego agent) to execute.

2. Examples

In an example, the method can include: collecting decisioning data at a set of sensors; identifying a set of environmental agents in the environment of an ego agent (e.g., an autonomous vehicle); generating a tree model (e.g., Bayesian decision tree) for each environmental agent; and determining a set of environmental policy options for each environmental agent based on the corresponding tree model. In a specific example, the tree model for an environmental agent can include nodes representing hypotheses for the environmental agent, where each hypothesis can be a possible outcome for a decision. Specific examples of decisions include: environmental agent classification decisions, starting edge decisions (e.g., current lane decisions), route decisions, acceleration decisions, environmental agent response to the ego agent decisions, jaywalking decisions, and/or any other decisions for a characteristic of the environmental agent.

In a specific example, generating the tree model for an environmental agent can include, for each of a set of decisions: selecting a subset of the decisioning data (e.g., a subset of the decisioning data relevant to the decision); and determining a probability for each of a set of hypotheses based on the subset of decisioning data and optionally based on the probability of a parent hypothesis, using a decision model that corresponds to the decision. The set of child hypotheses (corresponding to a child decision) of a parent hypothesis (corresponding to a parent decision) can: be a predetermined set of hypotheses for the child decision, be determined on the decisioning data, be determined based on the parent hypothesis, and/or be otherwise determined. The method can optionally include pruning a branch (e.g., ceasing generation and/or evaluation of child hypotheses of the branch).

The generated tree model for an environmental agent can include a set of likely hypothesized states (e.g., unpruned branches). Each hypothesized state can define an environmental policy option for the environmental agent. In a specific example, the method can include performing forward simulations based on the set of environmental policy options for each environmental agent and a set of ego policy options, wherein the forward simulations can be used (e.g., within a multi-policy decision-making process) to select a policy for the ego agent to execute. In a specific example, the method can be implemented by a processing system and a set of sensors onboard the ego agent.

3. Technical Advantages

Variants of the technology can confer one or more advantages over conventional technologies.

First, variants of the technology can confer the benefit of providing greater explainability (e.g., higher model transparency) compared to other potential systems and methods for predicting external agent behavior (e.g., black-box models, end-to-end models, etc.) by systematically evaluating decisions tied to real-world parameters (e.g., decisions with semantic meaning, physics-based decisions, etc.). In an example, one or more hyperparameters associated with decision evaluations can be rooted in physical dimensions (e.g., agent speed, position, etc.).

Second, variants of the technology can be modular, which can confer the benefit of enabling the system to be expanded upon and/or modified for use in different or additional applications (e.g., new routes with new objects, new vehicle types, new zone types, etc.). For example, in such a modular system, decisions are evaluated progressively in independent modules, wherein each decision can be evaluated with a particular form of evidence and a particular evaluation method. Modularity can further enable an individualized optimization of evaluation methods, such as through the application of different model types (e.g., statistical models, physics-based models, neural networks, learning models, combinations thereof, etc.) to each decision node within the intent estimation model (e.g., a tree-like model), where the selection of the particular model at each node can be based on any or all of: the decision type, system requirements (e.g., latency, accuracy, etc.), the parent hypothesis, available decisioning data, and/or any other factors.

Third, variants of the technology can confer the benefit of reducing the time and/or computational resources required to troubleshoot and/or tune an intent estimation model. In an example, the modular design can enable individual components (e.g., nodes) of the intent estimation model (e.g., one at a time, groups of components, etc.) to be interrogated in the event that a higher-level failure occurs. In a specific example, if an individual component is underperforming, that component can be turned off or replaced without affecting the performance of other elements of the intent estimation model. By reducing interdependencies of individual components of the intent estimation model, variants of the technology can confer the advantage of making the overall intent estimation pipeline more resilient to errors at any one component.

Fourth, variants of the technology can confer the benefit of improving autonomy performance (e.g., safer outcomes, more efficient outcomes, etc.) of an autonomous system while reducing latency requirements of the system. In variants, this advantage can be enabled by simulating a reduced set of likely environmental agent policies, while policies with effectively impossible or near-impossible likelihoods are pruned during hypothesis evaluation (e.g., during traversal of an intent estimation model). In a specific example, the set of environmental agent policies can be sampled for simulations based on a probability associated with each environmental agent policy option (e.g., the probability of each leaf node of the intent estimation model).

However, further advantages can be provided by the system and method disclosed herein.

4. System

As shown in FIG. 2A, the system 200 can include: a computing system and a sensor suite. The system 200 can optionally include and/or interface with (e.g., communicate with, implement, run, etc.): an ego agent (e.g., wherein all or a portion of the computing system is onboard the ego agent), a vehicle control system, a set of infrastructure devices, a communication interface, a teleoperator platform, a tracker, a positioning system, a guidance system, and/or any other suitable components.

Figure 2B:
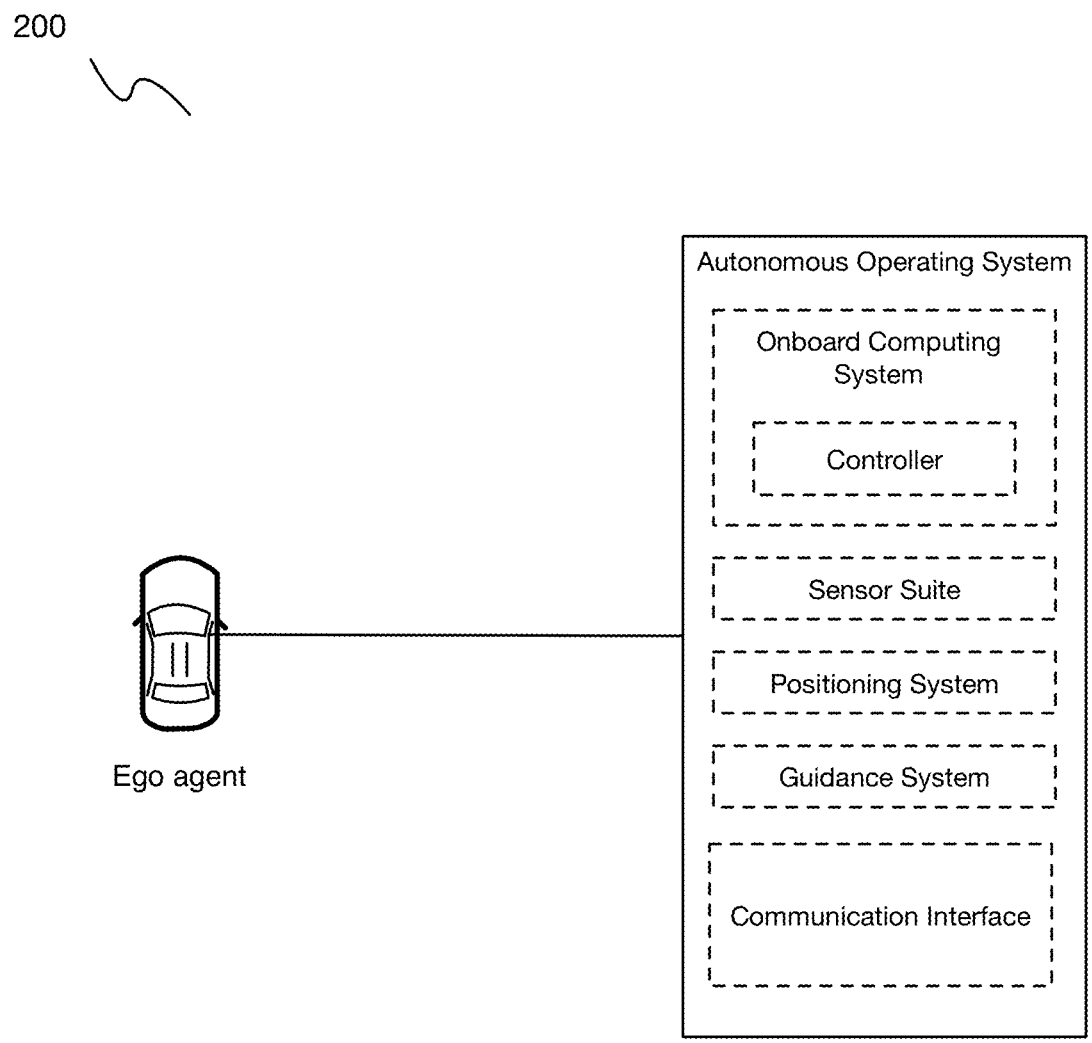
FIG. 2B is a schematic representation of an example of the system.

The system 200 can optionally include and/or interface with (e.g., can be integrated within) an ego agent (equivalently referred to herein as an autonomous vehicle, autonomous agent, ego vehicle, agent, etc.). An example is shown in FIG. 2B. The ego agent is preferably an autonomous vehicle, and further preferably a fully autonomous vehicle and/or a vehicle able to be operated as a fully autonomous vehicle. However, the ego agent can additionally or alternatively be a semi-autonomous vehicle and/or any other vehicle. In preferred variations, the ego agent is an automobile (e.g., car, driverless car, bus, shuttle, taxi, ride-share vehicle, truck, semi-truck, etc.). Additionally or alternatively, the ego agent can include any or all of: a watercraft (e.g., boat, water taxi, etc.), aerial vehicle (e.g., plane, helicopter, drone, etc.), terrestrial vehicle (e.g., 2-wheeled vehicle, bike, motorcycle, scooter, etc.), and/or any other suitable vehicle and/or transportation device, autonomous machine, autonomous device, autonomous robot, and/or any other suitable device.

The computing system can function to implement any or all of the processes of the method. The computing system can include and/or interface with a processing system (e.g., processor or set of processors, graphical processing unit or GPU, central processing unit or CPU, or any suitable processing circuitry) and memory, but can additionally or alternatively include any other suitable components. The memory can be short term (e.g., volatile, non-volatile, random access memory or RAM, etc.) and/or long term (e.g., flash memory, hard disk, etc.) memory.

The computing system preferably includes an onboard computing subsystem arranged onboard (e.g., integrated within) the ego agent. Additionally or alternatively, the computing system can include any or all of: a remote computing subsystem (e.g., cloud computing system, remote computing in communication with an onboard computing system, in place of an onboard computing system, etc.), a computing subsystem integrated in a supplementary device (e.g., mobile device, user device, etc.), an edge device including mobile computing devices, and/or any other suitable computing subsystems and devices. In some variations, for instance, the ego agent is operable in communication with a remote or disparate computing system that may include a user device (e.g., a mobile phone, a laptop, etc.), a remote server, a cloud server, or any other suitable local and/or distributed computing system remote from the vehicle. The remote computing subsystem can be connected to one or more systems of the autonomous agent through one or more data connections (e.g., channels), but can alternatively communicate with the vehicle system in any suitable manner.

The system 200 can optionally include and/or interface with a vehicle control system including vehicle modules/components which function to effect vehicle motion based on the operational instructions (e.g., plans and/or trajectories) generated by one or more computing systems and/or controllers. In a specific example, the vehicle control system can implement a selected ego agent policy. Additionally or alternatively, the vehicle control system can include, interface with, and/or communicate with any or all of a set electronic modules of the agent, such as but not limited to, any or all of: component drivers, electronic control units (ECUs), telematic control units (TCUs), transmission control modules (TCMs), antilock braking system (ABS) control modules, and/or any other suitable control subsystems and/or modules. In preferred variations, the vehicle control system includes, interfaces with, and/or implements a drive-by-wire system of the vehicle. Additionally or alternatively, the vehicle can be operated in accordance with the actuation of one or more mechanical components, and/or be otherwise implemented. However, the system 200 can include or be used with any other suitable vehicle control system; or can be otherwise suitably implemented. For example, the system 200 can be implemented in conjunction with the vehicle control system(s) and/or fallback controller as described in U.S. application Ser. No. 17/550,461, filed 14 Dec. 2021, which is incorporated herein in its entirety by this reference.

The system 200 can optionally include or interface with a sensor suite, which functions to collect data (e.g., decisioning data), monitor vehicle state parameters, and/or monitor an environment of the vehicle. Data collected using the sensor suite can optionally be used as inputs for vehicle control (e.g., autonomous vehicle control). The sensor suite can be located onboard the ego agent, onboard a set of infrastructure devices, a combination thereof, and/or otherwise positioned. The sensor suite can include: perception sensors (e.g., motion sensors, time of flight sensors, cameras, Radar, Lidar, etc.), environmental sensors (e.g., cameras, temperature, wind speed/direction, barometers, air flow meters), guidance sensors (e.g., Lidar, Radar, cameras, etc.), cameras (e.g., CCD, CMOS, multispectral, visual range, hyperspectral, stereoscopic, etc.), spatial sensors, internal sensors (e.g., accelerometers, magnetometer, gyroscopes, IMU, INS, temperature, voltage/current sensors, etc.), inertial sensors (e.g., IMU, accelerometers, magnetometer, gyroscopes, etc.), diagnostic sensors (e.g., cooling sensors such as: pressure, flow-rate, temperature, etc.; BMS sensors; tractor/trailer inter-connection sensors or passthrough monitoring, etc.), location sensors (e.g., GPS, GNSS, triangulation, trilateration, etc.), wheel encoders, proximity sensors, OBD-port, and/or any other suitable sensors. The computing system preferably receives sensor inputs from the sensor(s) of the sensor suite, but the inputs can additionally or alternatively include historical information associated with the ego agent (e.g., historical state estimates of the ego agent) and/or environmental agents (e.g., historical state estimates for the environmental agents), sensor inputs from sensor systems offboard the ego agent (e.g., onboard other ego agents or environmental agents, onboard a set of infrastructure devices and/or roadside units, etc.), environmental representation (e.g., determined based on current and/or historical sensor data), and/or any other inputs or information. However, the system 200 can include any other suitable sensor suite.

The system 200 can optionally include and/or interface with (e.g., receive information from) a set of infrastructure devices (equivalently referred to herein as roadside units) which can individually and/or collectively function to observe one or more aspects and/or features of an environment and collect observation data relating to the one or more aspects and/or features of the environment. The set of infrastructure devices are preferably in communication with the computing system (e.g., with an onboard computing system of the ego agent), but can additionally or alternatively be in communication with the tele-assist platform, any other components, and/or any combination. In an example, the infrastructure devices can include devices in an immediate and/or close proximity or within short-range communication proximity to an operating position of the ego agent and can function to collect data regarding circumstances surrounding the ego agent and in areas proximate to a zone of operation of the ego agent. In some embodiments, the roadside units include one or more of offboard sensing devices including flash LIDAR, thermal imaging devices (thermal cameras), still or video capturing devices (e.g., image cameras and/or video cameras, etc.), global positioning systems, radar systems, microwave systems, inertial measuring units (IMUs), and/or any other suitable sensing devices or combination of sensing devices.

The system 200 can optionally include a communication interface in communication with the computing system, which functions to enable information to be received at the computing system (e.g., from infrastructure devices, from a remote computing system and/or remote server, from a teleoperator platform, from another autonomous agent or other vehicle, etc.) and/or transmitted from the computing system (e.g., to a remote computing system and/or remote server, to a teleoperator platform, to an infrastructure device, to another autonomous agent or other vehicle, etc.). The communication interface preferably includes a wireless communication system (e.g., Wi-Fi, Bluetooth, cellular 3G, cellular 4G, cellular 5G, multiple-input multiple-output or MIMO, one or more radios, or any other suitable wireless communication system or protocol), but can additionally or alternatively include any or all of: a wired communication system (e.g., modulated powerline data transfer, Ethernet, or any other suitable wired data communication system or protocol), a data transfer bus (e.g., CAN, FlexRay), and/or any other suitable components.

The computing system can optionally include, interface with, and/or be configured to perform processes in conjunction with a simulator subsystem, wherein the simulator subsystem functions to perform a set of simulations (e.g., as described below). The set of simulations can optionally function to predict future scenarios associated with the ego agent and/or environmental agent(s) (e.g., other vehicles, pedestrians, dynamic and/or static objects, etc.) in its environment (e.g., in the ego agent's surroundings, within a field of view of the ego agent's sensors, within a predetermined radius relative to the ego agent, etc.).

The simulator subsystem (e.g., a set of simulators) can be configured to perform forward simulations, which function to predict and/or analyze how the ego agent and/or its environment (e.g., including environmental agents) will evolve in the future (e.g., to a predetermined time within the future) based on the ego agent's current and/or historical understanding of its environment (e.g., current positions of the ego agent and environmental agents, historical positions of the ego agent and the environmental agents, current and/or historical information motion information associated with the ego agent and/or environmental agents). For example, the simulator subsystem can function to estimate future (e.g., steps forward in time) behaviors (e.g., operations, actions, maneuvers, location, speed, acceleration, heading, routes, etc.) for the ego agent and/or each of the environmental agents (e.g., pedestrians and/or other vehicles in an environment of the ego agent) identified in an operating environment of the ego agent (real or virtual). In a specific example, the simulator subsystem simulates a behavior of the ego agent given an ego agent policy (e.g., an ego agent policy option) and a behavior of each of the environmental agents given an environmental agent policy (e.g., an environmental agent policy option) for each environmental agent (e.g., where the behavior of the each of the environmental agents includes a simulated response to the ego agent executing the given ego agent policy). The simulations may be based on a current state of each agent (e.g., the current hypotheses) and/or historical actions or historical behaviors of each of the agents derived from the historical data buffer (e.g., including data up to a present moment). The simulations may provide data relating to interactions (e.g., relative positions, relative velocities, relative accelerations, etc.) between projected behavioral policies of each agent and the one or more potential behavioral policies that may be executed by the autonomous agent. In an example, a multi-policy decision-making module includes and/or implements the simulator subsystem (e.g., for selecting a policy for the ego agent).

In a preferred set of variations, for instance, throughout operation of the autonomous vehicle-such as, but not limited to, continuously, at a predetermined frequency (equivalently referred to herein as an election cycle) (e.g., between every tenth of a second and every second, at least every second, at least every 5 seconds, between every millisecond and every second, between 5-15 times per second, 10 times per second, between 1-100 times per second, between 1-20 times per second, between 1-50 times per second, etc.), at a predetermined set of intervals, upon the collection of new sensor information, etc.—a set of simulations is performed, which forward simulate the vehicle's environment into the future for the duration of a planning horizon associated with the simulation (e.g., to a predetermined time into the future, at each of a set of predetermined time intervals for a predetermined time into the future, for between the next 1-10 seconds into the future, for less than 1 second into the future, for greater than 10 seconds into the future, for between the next 0.1-30 seconds into the future, for between the next 2-8 seconds into the future, for the next 5-10 seconds into the future, for the next 8 seconds into the future, etc.). However, the simulator subsystem can perform any other simulations and/or types of simulations.

The computing system preferably functions to facilitate method execution. Additionally or alternatively, the computing system can function to process data from the sensor suite to determine a policy for each election cycle (e.g., with a frequency of about 10 Hz; 13 Hz, 15 Hz; etc.) of the ego agent, to be executed by the vehicle control system to facilitate autonomous operation. However, the computing system can be otherwise configured.

The computing system can include a set of models, which can include: intent estimation models, decision models, simulator models, a Multi-Policy Decision-making Model (MPDM), and/or any other suitable models.

The models can include classical or traditional approaches, machine learning approaches, and/or be otherwise configured. The models can include regression (e.g., linear regression, non-linear regression, logistic regression, etc.), tree-based models (e.g., decision tree, Bayesian decision tree, classification and regression tree, random forests, etc.), LSA, clustering, association rules, dimensionality reduction (e.g., PCA, t-SNE, LDA, etc.), neural networks (e.g., CNN, DNN, CAN, LSTM, RNN, encoders, decoders, deep learning models, transformers, etc.), ensemble methods, optimization methods, classification, rules, heuristics, equations (e.g., weighted equations, etc.), selection (e.g., from a library), regularization methods (e.g., ridge regression), Bayesian methods (e.g., Naiive Bayes, Markov), instance-based methods (e.g., nearest neighbor), kernel methods, support vectors (e.g., SVM, SVC, etc.), statistical models (e.g., tree models, Bayesian probability models, etc.), physics-based models (e.g., dynamic equations, static equations, energy conservation principles, etc.), comparison methods (e.g., matching, distance metrics, thresholds, etc.), deterministics, genetic programs, and/or any other suitable model. The models can include (e.g., be constructed using) a set of input layers, output layers, and hidden layers (e.g., connected in series, such as in a feed forward network; connected with a feedback loop between the output and the input, such as in a recurrent neural network; etc.; wherein the layer weights and/or connections can be learned through training); a set of connected convolution layers (e.g., in a CNN); a set of self-attention layers; and/or have any other suitable architecture.

Models can be trained, learned, fit, predetermined, and/or can be otherwise determined. The models can be trained or learned using: supervised learning, unsupervised learning, self-supervised learning, semi-supervised learning (e.g., positive-unlabeled learning), reinforcement learning, transfer learning, Bayesian optimization, fitting, interpolation and/or approximation (e.g., using gaussian processes), back-propagation, and/or otherwise generated. The models can be learned or trained on: labeled data (e.g., data labeled with the target label), unlabeled data, positive training sets (e.g., a set of data with true positive labels, negative training sets (e.g., a set of data with true negative labels), and/or any other suitable set of data.

Any model can optionally be validated, verified, reinforced, calibrated, or otherwise updated based on newly received, up-to-date measurements; past measurements recorded during the operating session; historic measurements recorded during past operating sessions; or be updated based on any other suitable data.

Any model can optionally be run or updated: once; at a predetermined frequency; every time the method is performed; every time an unanticipated measurement value is received; or at any other suitable frequency. Any model can optionally be run or updated: in response to determination of an actual result differing from an expected result; or at any other suitable frequency. Any model can optionally be run or updated concurrently with one or more other models, serially, at varying frequencies, or at any other suitable time.

However, the computing system can include any other suitable set of models.

Additionally or alternatively, the system 200 can include or all of the components as described in any or all of: U.S. application Ser. No. 16/514,624, filed 17 Jul. 2019; U.S. application Ser. No. 16/505,372, filed 8 Jul. 2019; U.S. application Ser. No. 16/540,836, filed 14 Aug. 2019; U.S. application Ser. No. 16/792,780, filed 17 Feb. 2020; U.S. application Ser. No. 17/365,538, filed 1 Jul. 2021; U.S. application Ser. No. 17/550,461, filed 14 Dec. 2021; U.S. application Ser. No. 17/554,619, filed 17 Dec. 2021; U.S. application Ser. No. 17/712,757, filed 4 Apr. 2022; U.S. application Ser. No. 17/826,655, filed 27 May 2022; U.S. application Ser. No. 18/073,209, filed 1 Dec. 2022; and U.S. application Ser. No. 18/072,939, filed 1 Dec. 2022; each of which is incorporated in its entirety by this reference.

However, the system 200 can be otherwise configured.

5. Method

As shown in FIG. 1, a method for predicting external agent behavior can include: collecting decisioning data S100, identifying a set of environmental agents S200, and evaluating a set of hypotheses for an environmental agent S300. In variants, the method can optionally include: determining a set of environmental agent policy options based on the set of hypotheses S400, determining a set of ego agent policy options S500, evaluating the set of environmental agent policy options and/or the set of ego agent policy options S600, selecting an ego agent policy based on the evaluation S700, and/or any other suitable steps.

All or portions of the method can be performed in real time (e.g., responsive to a request), in response to a trigger, iteratively, concurrently, asynchronously, periodically (e.g., at a prescribed frequency), and/or at any other suitable time. All or portions of the method can optionally be performed one or more times for each election cycle (e.g., with a frequency of about 10 Hz; 13 Hz, 15 Hz; etc.) of the ego agent. All or portions of the method can be performed automatically, manually, semi-automatically, and/or otherwise performed. All or portions of the method can be performed by one or more components of the system 200 and/or by any other suitable system.

The method 100 can optionally be configured to interface with a multi-policy decision-making process (e.g., multi-policy decision-making task block of a computer-readable medium) of the ego agent and any associated components (e.g., computers, processors, software modules, etc.), but can additionally or alternatively interface with any other decision-making processes. In a preferred set of variations, for instance, a multi-policy decision-making module of a computing subsystem (e.g., onboard computing system) includes a simulator subsystem (e.g., as described above) that functions to perform a set of simulations. The simulations can be based on a current state of each agent (e.g., the current hypotheses) and/or historical actions or historical behaviors of each of the agents derived from the historical data buffer (e.g., including data up to a present moment). The simulations can provide data relating to interactions (e.g., relative positions, relative velocities, relative accelerations, etc.) between projected behavioral policies of each environmental agent and the one or more potential behavioral policies that may be executed by the autonomous agent. The data from the simulations can be used to determine (e.g., calculate) any number of metrics, which can individually and/or collectively function to assess any or all of: the potential impact of the ego agent on any or all of the environmental agents when executing a certain policy, the risk of executing a certain policy (e.g., collision risk), the extent to which executing a certain policy progresses the ego agent toward a certain goal, and/or determining any other metrics involved in selecting a policy for the ego agent to implement.

The multi-policy decision-making process can additionally or alternatively include and/or interface with any other processes, such as, but not limited to, any or all of the processes described in: U.S. application Ser. No. 16/514,624, filed 17 Jul. 2019; and U.S. application Ser. No. 17/365,538, filed 1 Jul. 2021; each of which is incorporated in its entirety by this reference, or any other suitable processes performed in any suitable order.

Additionally or alternatively, the method 100 can include and/or interface with any other decision-making processes.

5.1 Method—Collecting Decisioning Data S100

The method 100 can include collecting decisioning data S100, which functions to acquire information (e.g., streams of data) from one or more data sources with which to assess the ego vehicle's environment. In an example, collecting decisioning data S100 can function to collect evidence for use in evaluating a set of hypotheses for an environmental agent (e.g., to predict an intent of the environmental agent).

S100 is preferably performed continuously (e.g., at a predetermined frequency, at irregular intervals, etc.) throughout operation of the ego agent. Additionally or alternatively, S100 can be performed: according to (e.g., at each initiation of, during each of, etc.) a cycle associated with the ego agent; in response to a trigger (e.g., a request, an initiation of a new cycle, etc.); and/or at any other times during the method 100. Examples of cycles associated with the ego agent include: an election cycle (e.g., 10 Hz cycle, between 5-20 Hz cycle, etc.) associated with the ego agent (e.g., in which the ego agent selects a new policy), a perception cycle associated with the ego agent, a planner cycle (e.g., 30 Hz, between 20-40 Hz, occurring more frequently than the election cycle, etc.) associated with the ego agent, and/or any other ego agent cycles.

In examples, decisioning data (e.g., environmental data) can include sensor data (e.g., inputs received from cameras, Lidars, Radars, motion sensors [e.g., accelerometers, gyroscopes, etc.], outputs of an OBD-port, location sensors [e.g., GPS sensor], etc.) received from a sensor suite onboard offboard the ego agent, sensor data received from a sensor suite offboard the ego agent (e.g., onboard other ego agents or environmental agents, onboard a set of infrastructure devices and/or roadside units, etc.), supplementary data (e.g., traffic information, a route network and/or map, etc.), historical data (e.g., outcomes of previously performed iterations of the method), and/or any other data.

The decisioning data can include information which characterizes the environment of the ego agent, which can include: environmental agents and/or environmental features of the ego agent's surroundings (e.g., to be referenced in a map, to locate the ego agent, etc.). In some variations, for instance, the decisioning data includes information (e.g., from sensors onboard the ego agent, from sensors in an environment of the ego agent, from sensors onboard the objects, etc.) that characterizes any or all of: the location, type/class (e.g., vehicle vs. pedestrian, etc.), and/or kinematics (e.g., motion) of environmental agents. Additionally or alternatively, the decisioning data can include information that characterizes (e.g., locates, identifies, etc.) features of the road and/or other landmarks/infrastructure (e.g., where lane lines are, where the edges of the road are, where traffic signals are and which type they are, where agents are relative to these landmarks, etc.), such that the ego agent can locate itself and/or environmental agents within its environment (e.g., in order to reference a map), and/or any other information. Additionally or alternatively, the decisioning data can include information characterizing an agent (e.g., the ego agent or an environmental agent), such as: the location of the agent (e.g., relative to the world, relative to one or more maps, relative to other objects, etc.), motion (e.g., speed, acceleration, etc.) of the agent, orientation of the agent (e.g., heading angle), a performance and/or health of the agent and any of its subsystems (e.g., health of sensors, health of computing system, etc.), and/or any other information. In specific examples, the decisioning data (and/or evidence determined based on the decisioning data) can include: environmental agent velocity (e.g., averaged over 1 second), a distance of the environmental agent to a branching point (e.g., for a pedestrian, the distance to a sidewalk, the distance to an edge split, etc.; for a vehicle, the distance to the next split in the route network), a right of way determination (e.g., a binary determination for whether the environmental agent has the right of way), stopping zones (e.g., traffic lights, stop signs, yield signs, etc.), a distance to a cruise control target, a distance to the ego agent, location relative to the ego agent (e.g., whether the environmental agent is behind the ego agent), velocity relative to the ego agent (e.g., whether the environmental agent is moving away from the ego agent), and/or any other information.

Additionally or alternatively, S100 can include any other processes and/or be otherwise suitably performed.

5.2 Method—Identifying a Set of Environmental Agents S200

The method 100 can include identifying a set of environmental agents S200, which can function to identify (e.g., detect) one or more agents (e.g., vehicles, pedestrians, etc.) in the environment of the ego agent. S200 can additionally or alternatively function to determine that no environmental agents are of interest to the ego agent.

Environmental agents (e.g., external agents) can include vehicles (e.g., automobiles, aerial vehicles, terrestrial vehicles, etc.), pedestrians, any other transportation agent, obstacles, a combination thereof, and/or any other object in an environment of the ego agent. Environmental agents can include static objects (e.g., parked or otherwise non-moving vehicles, stationary pedestrians, etc.), dynamic objects (e.g., moving vehicles, walking or running pedestrians, bikers, etc.), and/or a combination thereof. Environmental agents can included observed environmental agents (e.g., identified based on sensor data) and/or simulated environmental agents (e.g., shadow agents). The set of environmental agents can include a single environmental agent or multiple environmental agents (e.g., at least 2 environmental agents, at least 3 environmental agents, at least 5 environmental agents, at least 10 environmental agents, etc.).

Identifying the set of environmental agents can include identifying (e.g., labeling, only identifying, etc.) environmental agents satisfying one or more criteria. For example, the set of environmental agents can include: environmental agents whose behavior could affect the ego agent (e.g., whose path could intersect the path of the ego agent, dynamic environmental agents, etc.), environmental agents within a field-of-view of the sensors of the ego agent and/or infrastructure devices, environmental agents within a predetermined radius of the ego agent, a combination thereof, and/or any other environmental agents satisfying one or more criteria. In a specific example, S200 can include determining a representation (e.g., a 3D model) of a scene (e.g., an environment surrounding the ego agent) based on data collected by the sensors (e.g., as described in S100), and detecting all environmental agents within the scene and/or all environmental agents within the scene satisfying a set of criteria (e.g., within a predetermined radius of the ego agent, moving agents, agents of a certain class/type or classes, etc.).

In variants, S200 can output an identification of each environmental agent in the set of environmental agents (e.g., an environmental agent identifier), the location of each environmental agent in the set of environmental agents, a bounding box for each environmental agent in the set of environmental agents, and/or any other suitable information. In variants, S200 can include tracking environmental agents in the set of environmental agents (e.g., tracking across time and/or space).

Additionally or alternatively, S200 can include any other processes and/or be otherwise suitably performed.

5.3 Method—Evaluating a Set of Hypotheses for an Environmental Agent S300

The method 100 can include evaluating a set of hypotheses for each environmental agent S300, which can function to estimate a current and/or future state of an environmental agent, and/or otherwise function. S300 can be performed after S100, after S200, and/or at any other time. S300 can optionally be iteratively performed. For example, S300 can be iteratively performed for each environmental agent in the set of environmental agents, for each decision of a set of decisions, for each of a set of timepoints, and/or otherwise performed.

A hypothesis is preferably an assumption for one or more characteristics (equivalently referred to herein as attributes) of an environmental agent, but can otherwise characterize the environmental agent. Characteristics of an environmental agent can include time-independent characteristics and/or time-dependent characteristics. Examples of time-independent characteristics can include: environmental agent classification, environmental agent sub-classification, environmental agent shape (e.g., hull shape, length, width, etc.), and/or any other characteristics of the environmental agent. Time-dependent characteristics can include current characteristics and/or predicted future characteristics. For example, the hypotheses for an environmental agent can include hypotheses for a current state of the environmental agent and hypotheses for a predicted future state of the environmental agent. Examples of current characteristics include: location at the current time (e.g., geographic position, starting edge, etc.), orientation at the current time (e.g., relative to ego vehicle, relative to the road, relative to cardinal directions, etc.), heading at the current time, starting edge (e.g., current lane of the environmental agent), velocity at the current time, acceleration at the current time, environmental agent sub-classification at the current time (e.g., whether the environmental agent is currently jaywalking), and/or any other characteristics of the environmental agent at a current point in time. Examples of predicted future characteristics include: location at a future time, orientation at a future time (e.g., relative to ego vehicle, relative to the road, relative to cardinal directions, etc.), heading at a future time, velocity at a future time, acceleration at a future time, route, response to the ego agent, response to another environmental agent, environmental agent sub-classification at a future time (e.g., whether the environmental agent will jaywalk), and/or any other characteristics of the environmental agent at a future point in time. In a specific example, hypotheses for predicted future characteristics can include a set of actions (e.g., branches) that the environmental agent can take in the future.

A hypothesis can be qualitative, quantitative, relative, discrete, continuous (e.g., and bucketed into categorical hypotheses above or below a threshold value), a classification (e.g., categorical), numeric, binary, and/or otherwise defined. An illustrative example of a quantitative hypothesis (e.g., an estimation) can be: the velocity of the environmental agent is 50 mph. An illustrative example of a categorical hypothesis can be: the environmental agent is classified as a vehicle.

The set of hypotheses can optionally include one or more hypotheses for each decision in a set of decisions. Examples of decisions include: environmental agent classification decisions, environmental agent subclassification decisions, environmental agent movement classification decisions, starting edge decisions (e.g., current lane decisions), route decisions, acceleration decisions, environmental agent response to the ego agent decisions, environmental agent response to another environmental agent decisions, right-of-way decisions, jaywalking decisions, and/or any other decisions for a characteristic of the environmental agent.

In a first example, hypotheses for an environmental agent classification decision can include: vehicle, pedestrian, cyclist, scooterist, and/or any other environmental agent type. In a specific example, the environmental agent classification decision can be a binary decision, where the two hypotheses are: road vehicle and pedestrian. In a second example, hypotheses for an environmental agent subclassification decision can include: truck, van, SUV, compact car, motorcycle, walker, bicycle, scooter, animal, and/or any other environmental agent subtype. In a third example, an environmental agent movement classification decision can be a binary decision, where the two hypotheses are: moving and stationary. In a fourth example, hypotheses for a starting edge (e.g., current lane) decision can include: lane options (e.g., lane A, lane B, lane C, etc.), a percentage within a lane option (e.g., 50% in lane A, 95% in lane A, etc.), a probability for a lane option (e.g., 80% likely that the environmental agent is in lane A), and/or any other starting edge characterizations. In a fifth example, hypotheses for a route decision can include route options (e.g., route A, route B, route C, etc.), a probability for a route option, and/or any other route characterizations. In a specific example, route options can be route options given an assumed starting edge (e.g., assuming the environmental agent is currently in lane A). In a sixth example, hypotheses for an acceleration decision (equivalently referred to herein as an acceleration profile decision) can include: speed up (e.g., speed up beyond the speed limit, speed up to the speed limit, etc.), slow down (e.g., slow to a stop, slow to another speed, etc.), maintain speed, and/or any other acceleration profile options. Hypotheses for an acceleration decision can optionally be relative to a speed limit (e.g., a speed limit given an assumed starting edge for the environmental agent). In a seventh example, hypotheses for an environmental agent response to the ego agent decision can include: one or more yield hypotheses (e.g., a binary hypothesis that the environmental agent will yield to the ego agent versus not yield to the ego agent; a quantitative hypothesis of an estimated probability that the environmental agent will yield to the ego agent; etc.); one or more stop hypotheses (e.g., a binary hypothesis that the environmental agent will stop for the ego agent versus will not stop for the ego agent; a quantitative hypothesis of an estimated probability that the environmental agent will stop for the ego agent; a quantitative estimate of how much the environmental agent would be willing to brake due to the ego agent; etc.); and/or any other response hypotheses. In an eighth example, hypotheses for an environmental agent response to another environmental agent decision can include: one or more yield hypotheses (e.g., a binary hypothesis that the environmental agent will yield to the other environmental agent versus not yield to the other environmental agent; a quantitative hypothesis of an estimated probability that the environmental agent will yield to the other environmental agent; etc.); one or more stop hypotheses (e.g., binary hypothesis that the environmental agent will stop for the other environmental agent versus will not stop for the other environmental agent; a quantitative hypothesis of an estimated probability that the environmental agent will stop for the other environmental agent; a quantitative estimate of how much the environmental agent would be willing to brake due to the other environmental agent; etc.); and/or any other response hypotheses. In a ninth example, a right-of-way decision can be a binary decision, where the two hypotheses are: the environmental agent does have the right of way and the environmental agent does not have the right of way. In a tenth example, hypotheses for a jaywalking decision can include: walk to the edge of the sidewalk and stop; walk one car's width into the road and stop; walk to edge of the parking lane and stop; jaywalk; and/or any other actions for a potential jaywalker environmental agent. In an eleventh example, a jaywalking decision can be a binary decision, where the two hypotheses are: jaywalker and non-jaywalker.

The set of hypotheses for a decision can be: predetermined (e.g., the decision corresponds to a set of predetermined hypotheses), determined based on another hypothesis (e.g., a parent hypothesis), determined based on the decisioning data, manually determined, determined using a decision model, and/or otherwise determined. In a first specific example, the set of hypotheses for an environmental agent classification decision can be predetermined (e.g., vehicle and pedestrian). In a second specific example, the set of hypotheses for route decision can be determined based on another hypothesis (e.g., route options can be determined based on an assumed starting edge) and/or based on decisioning data (e.g., route options can be determined based on camera data and/or based on a route network).

Figure 4:
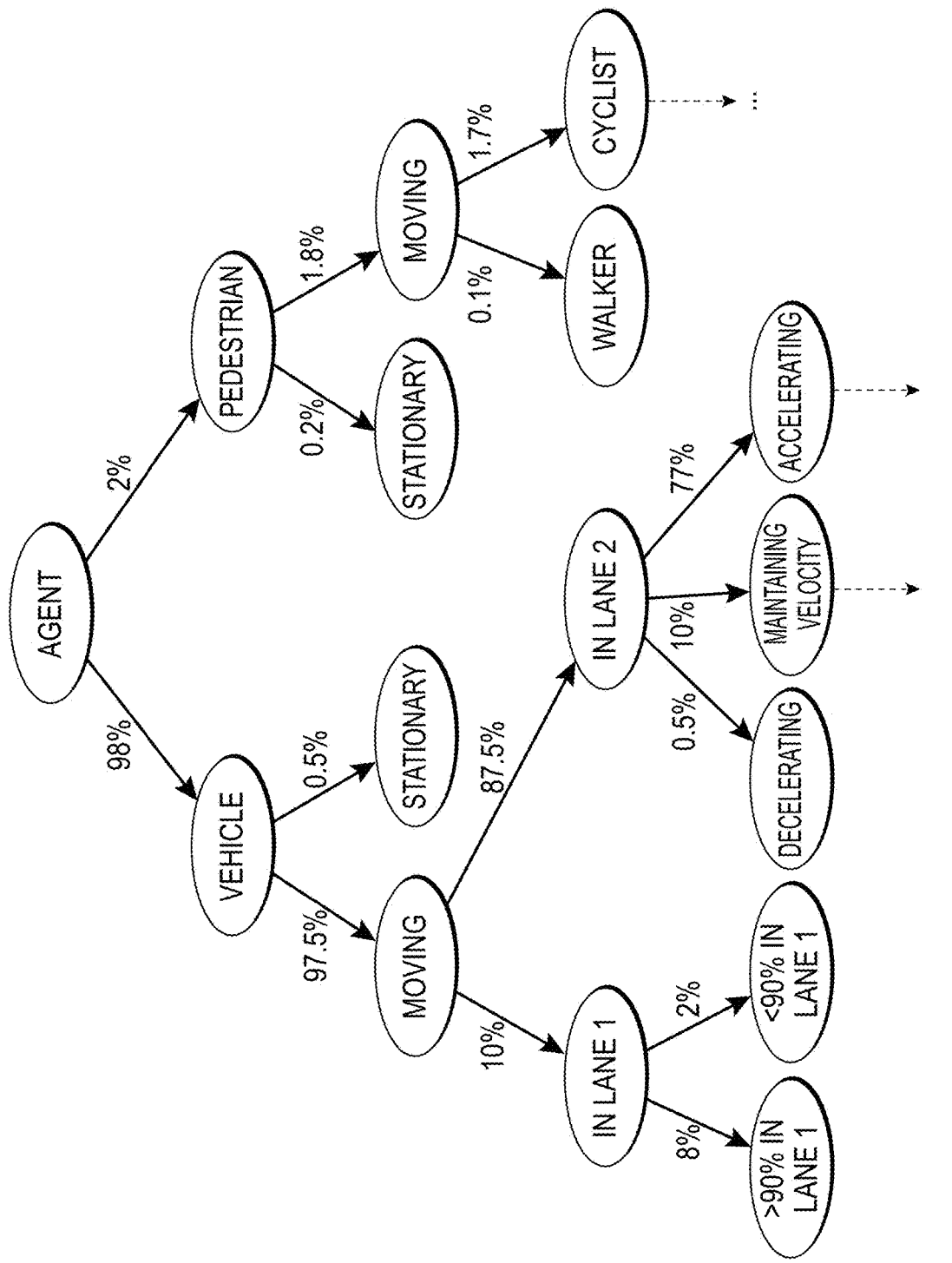
FIG. 4 is a first example of an intent estimation model (e.g., tree model) for an environmental agent.
Figure 5:
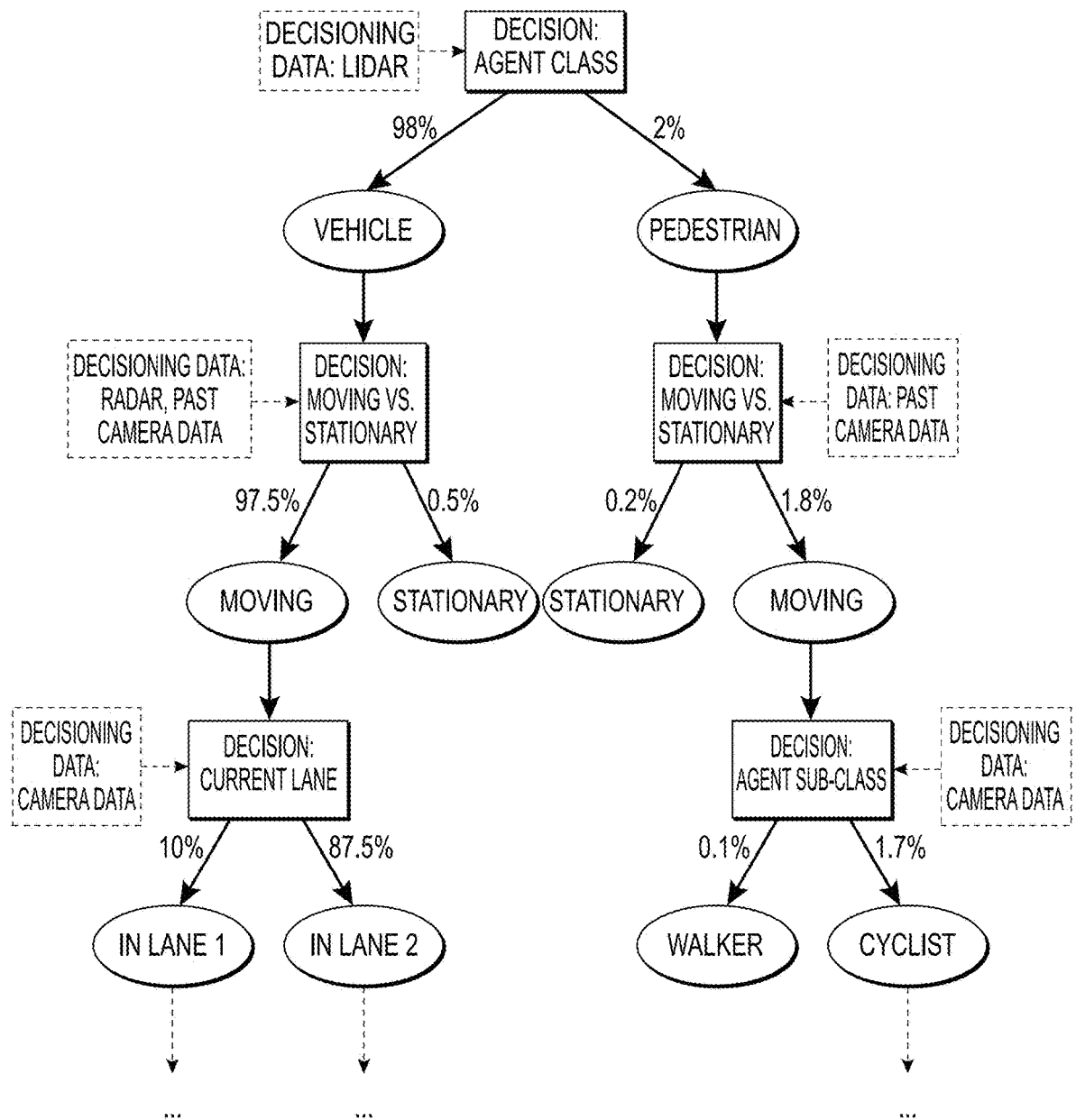
FIG. 5 is a second example of an intent estimation model (e.g., tree model) for an environmental agent.
Figure 6A:
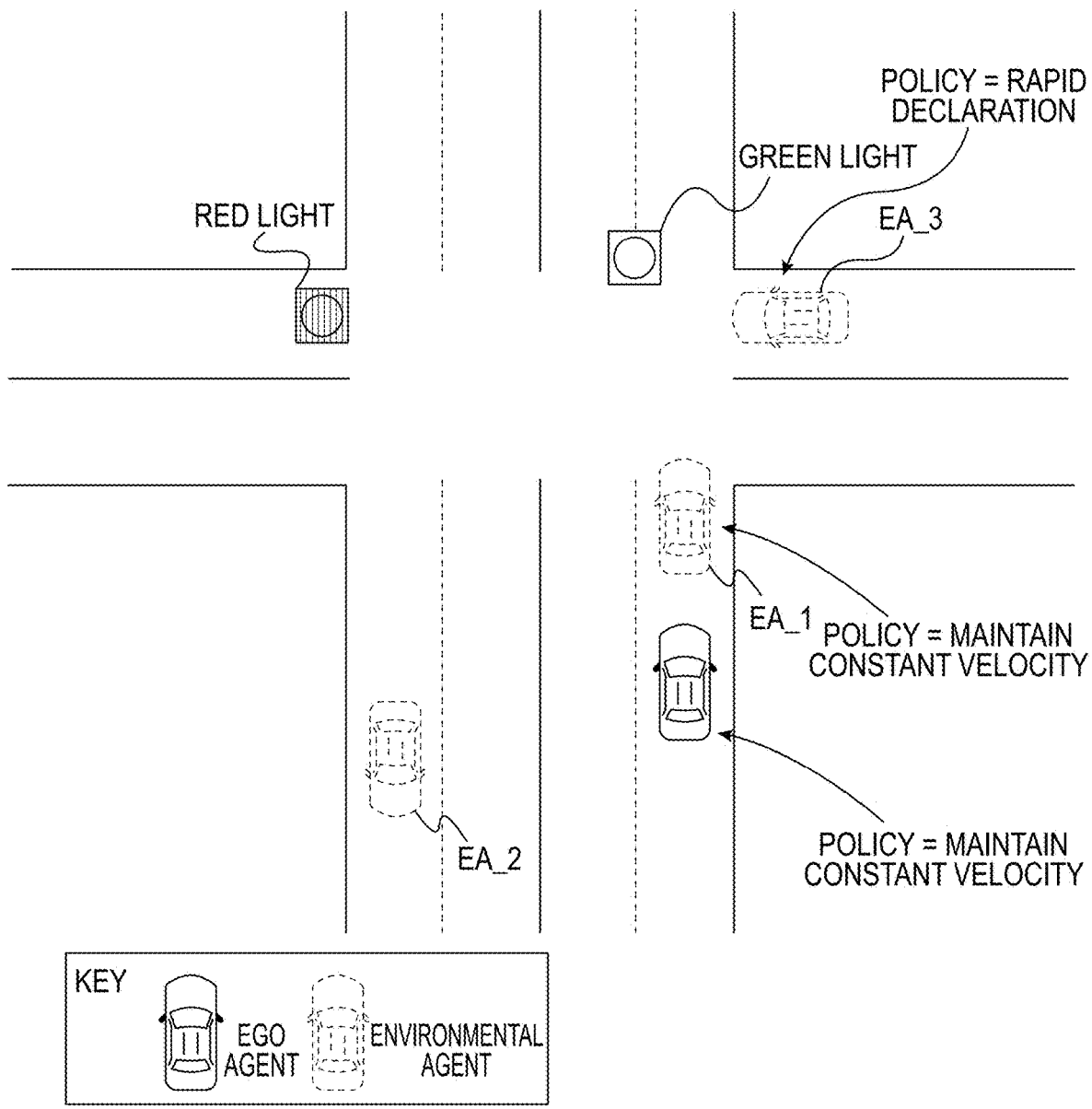
FIGS. 6A and 6B are schematic representations of variants of selecting an ego agent policy based on an evaluation.
Figure 6B:
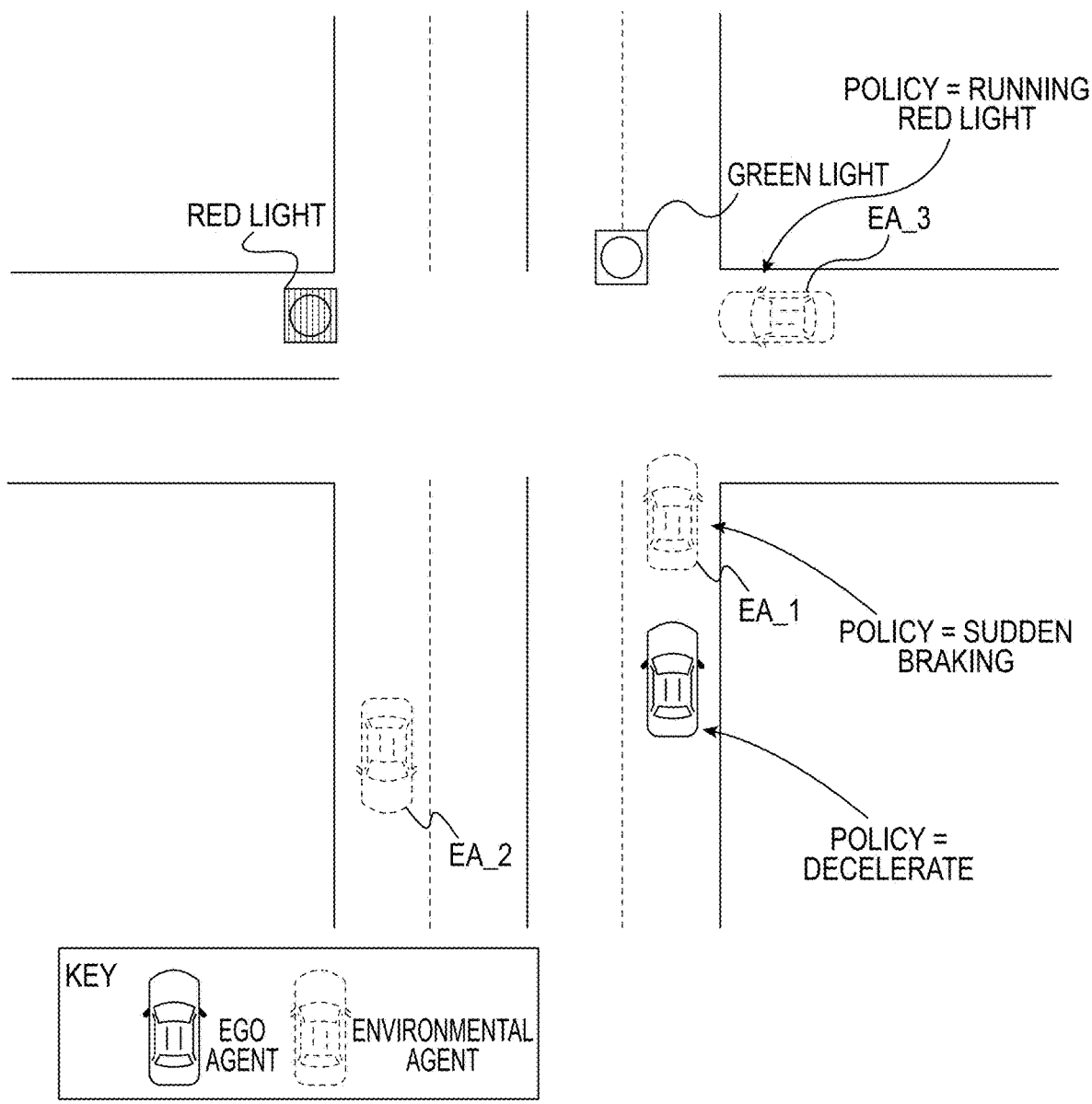
Figure 7:
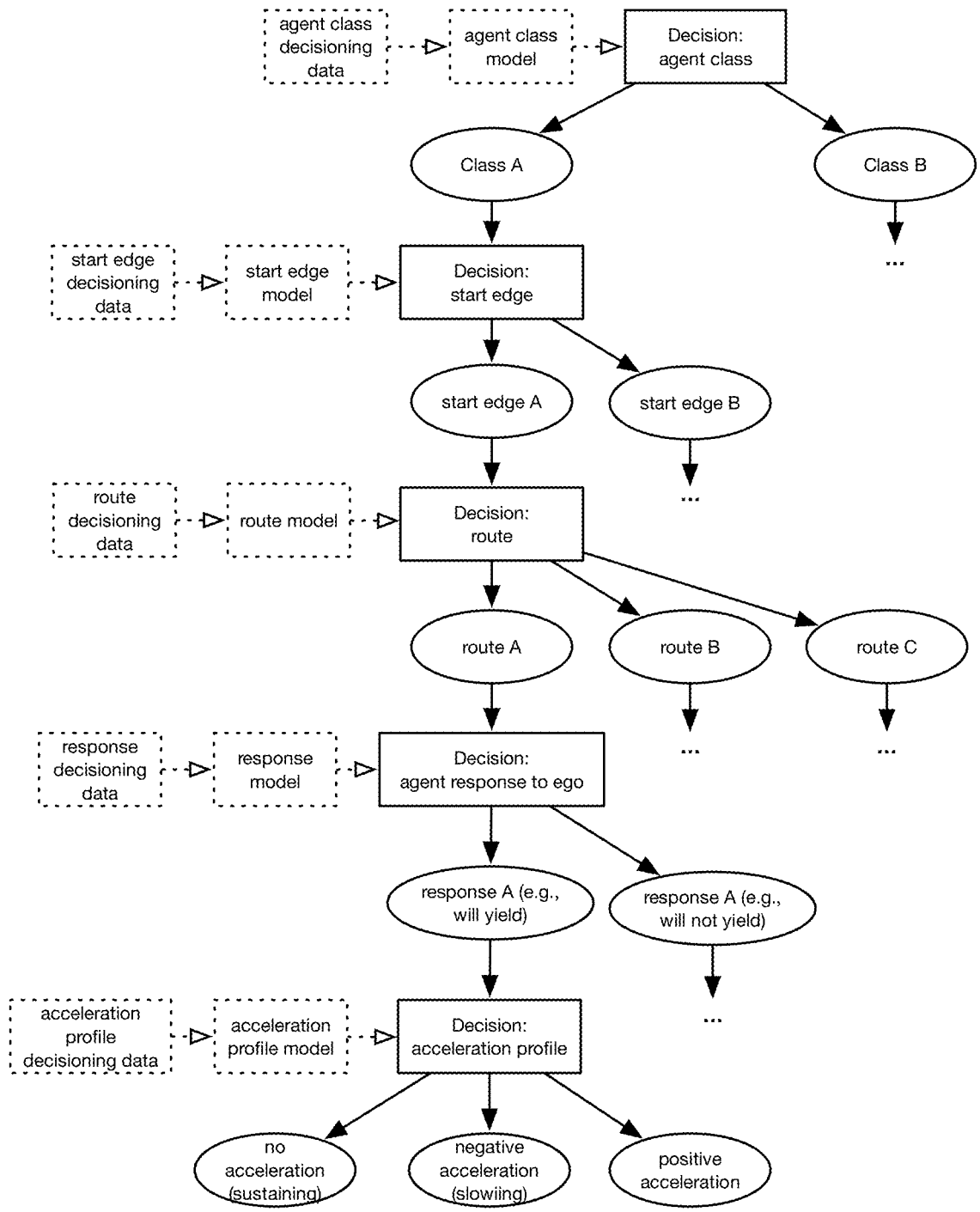
FIG. 7 is a third example of an intent estimation model for an environmental agent.
Figure 8:
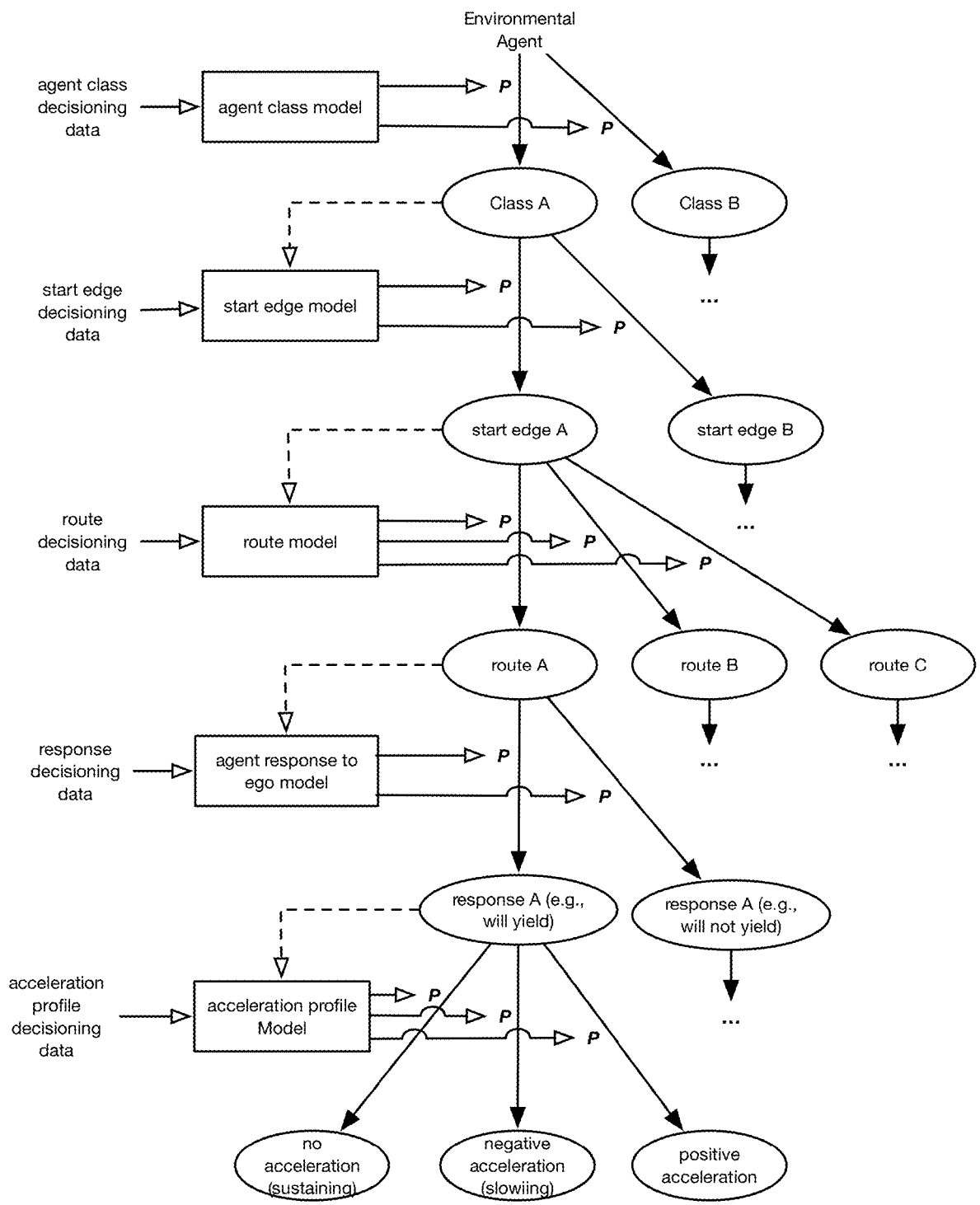
FIG. 8 is a fourth example of an intent estimation model for an environmental agent.

S300 can optionally be performed using an intent estimation model (equivalently referred to herein as an intent model). Examples are shown in FIG. 4, FIG. 5, FIG. 7, FIG. 8, FIG. 9A, FIG. 9B, and FIG. 10. In an example, the intent estimation model includes a tree model (equivalently referred to herein as a tree-based model or a tree-like model) of decisions and their potential outcomes (hypotheses) represented as nodes in the tree. Examples of a tree model include: decision tree (e.g., a Bayesian decision tree), a probability model, and/or any other tree model. In an example, S300 can include generating the intent estimation model for an environmental agent. In a first variant (e.g., as shown in FIG. 4 and FIG. 8), hypotheses can be represented as lower-level (e.g., child) nodes of higher-level (e.g., parent) nodes within the intent estimation model. As used herein, a parent hypothesis (e.g., a hypothesis corresponding to a parent node) can refer to the direct parent of a child hypothesis (e.g., a hypothesis corresponding to a child node) and/or an ancestor of the child hypothesis. In a second variant (e.g., as shown in FIG. 5 and FIG. 7), decisions can be represented as the parent and child nodes within the decision tree, with each decision branching based on a set of hypotheses generated for the decision. As used herein, a parent decision (e.g., a decision corresponding to a parent node) can refer to the direct parent of a child decision (e.g., a decision corresponding to a child node) and/or an ancestor of the child decision.

In a specific example, a parent hypothesis can be associated with a corresponding parent decision (e.g., where the parent hypothesis is one possible outcome of the parent decision), and a child hypothesis of the parent hypothesis can be associated with a corresponding child decision (e.g., where the child hypothesis is one possible outcome of the child decision). In an illustrative example, two hypotheses for 'parent decision 1' include 'parent hypothesis A' and 'parent hypothesis B'; 'child decision 1' is selected for 'parent hypothesis A' (e.g., predetermined based on a decision order, selected based on the parent hypothesis, etc.), where three hypotheses for 'child decision 1' (e.g., three possible outcomes of 'child decision 1', given 'parent hypothesis A') include 'child hypothesis A', 'child hypothesis B', and 'child hypothesis C'.

In an example, the intent estimation model can include a branched network of hypotheses for each decision in a set of decisions. For example, the intent estimation model can be generated based on the set of decisions, by: determining a set of parent hypotheses for a parent decision in the set of decisions; determining a probability for each of the set of parent hypotheses (e.g., using a decision model associated with the parent decision, based on decisioning data associated with the parent decision, a combination thereof, etc.); for one or more parent hypotheses in the set of parent hypotheses (e.g., the parent hypotheses with a probability above a threshold); determining a set of child hypotheses for a child decision in the set of decisions; determining a probability for each of the set of child hypotheses (e.g., using a decision model associated with the child decision, based on decisioning data associated with the child decision, a combination thereof, etc.), wherein the child hypotheses can optionally be the parent hypotheses in a subsequent iteration. A child decision for a given parent hypothesis can be predetermined and/or determined (e.g., selected) based on: the parent hypothesis, the probability of the parent hypothesis, decisioning data, and/or any other information.

In a specific example, generating an intent estimation model (e.g., tree model) for an environmental agent can include: for a parent decision in a set of decisions: using a decision model associated with the parent decision, determining a probability for each of a set of parent hypotheses for the parent decision based on the decisioning data (e.g., based on a subset of the decisioning data selected based on the child decision and/or the parent hypothesis); and for a child decision in the set of decisions: for each parent hypothesis in all or a portion of the set of parent hypotheses (e.g., the parent hypotheses satisfying a criterion): using a decision model associated with the child decision, determining a probability for each of a set of child hypotheses for the child decision based on the decisioning data (e.g., based on a subset of the decisioning data selected based on the child decision and/or the parent hypothesis).

Figure 9A:
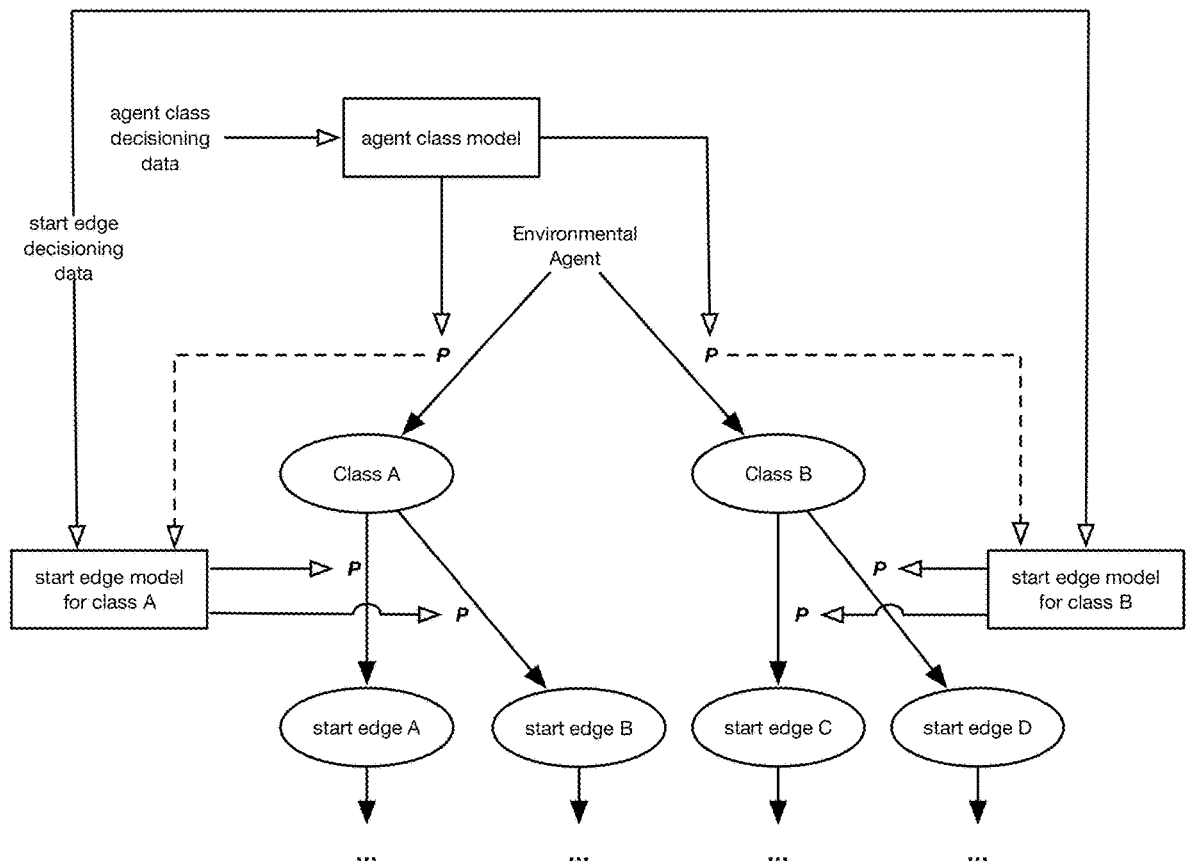
FIG. 9A is a specific example of an intent estimation model for an environmental agent (e.g., where a decision model is selected based on the parent hypothesis).
Figure 9B:
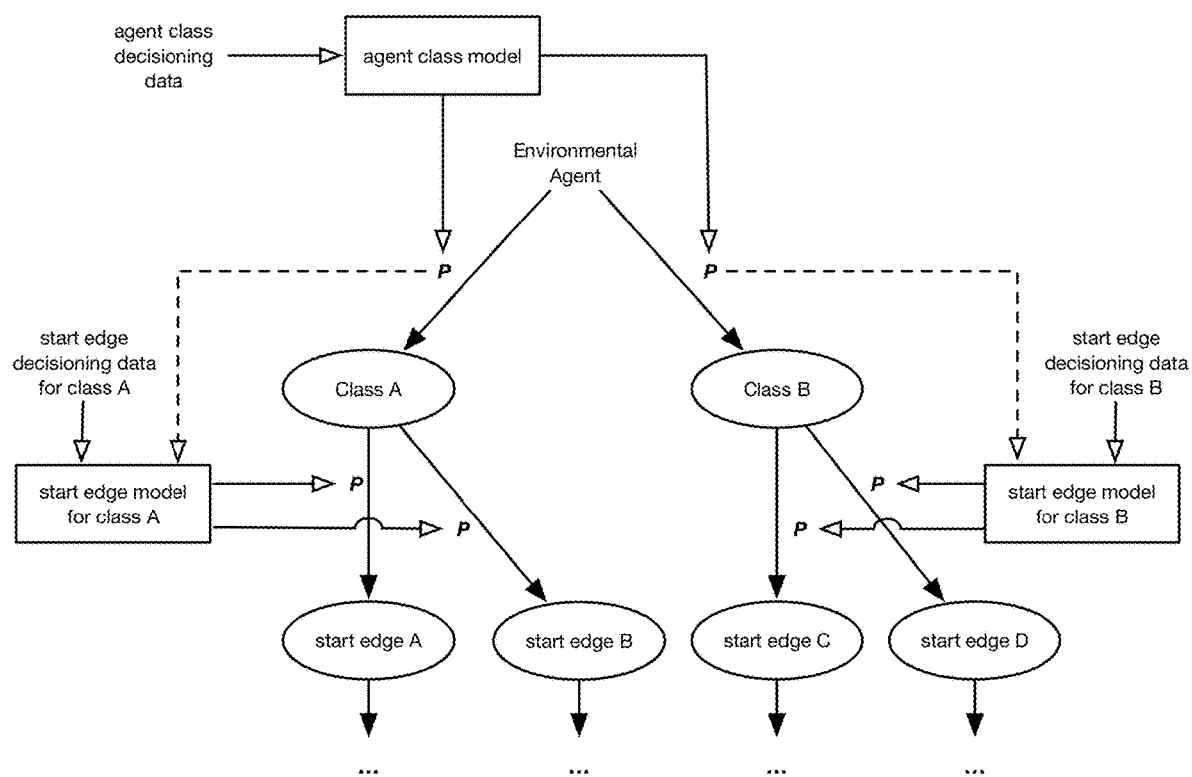
FIG. 9B is another specific example of an intent estimation model for an environmental agent (e.g., where decisioning data passed to a decision model is selected based on the parent hypothesis).
Figure 10:
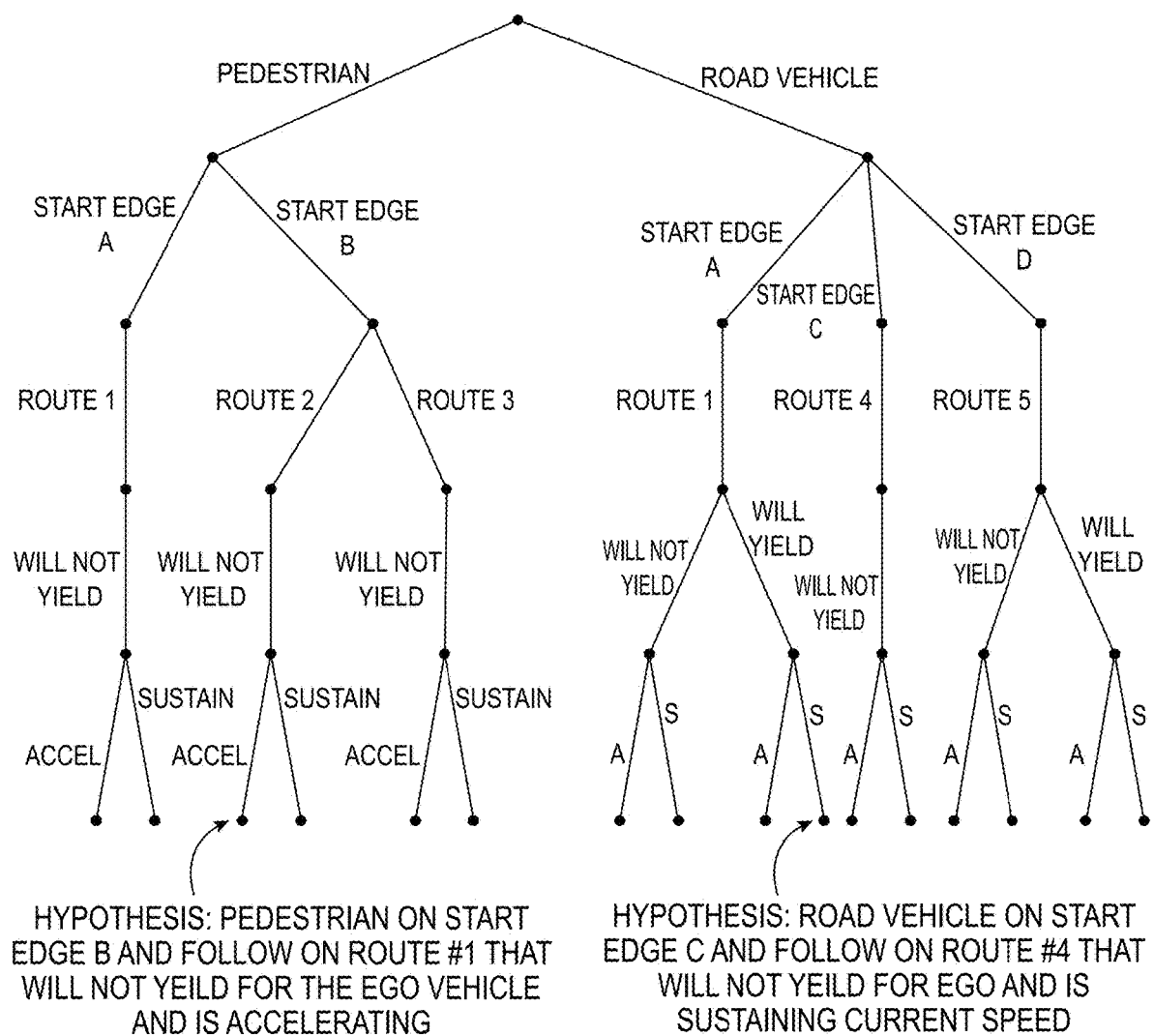
FIG. 10 is an illustrative example of an intent estimation model (e.g., tree model) for an environmental agent.
Figure 11A:
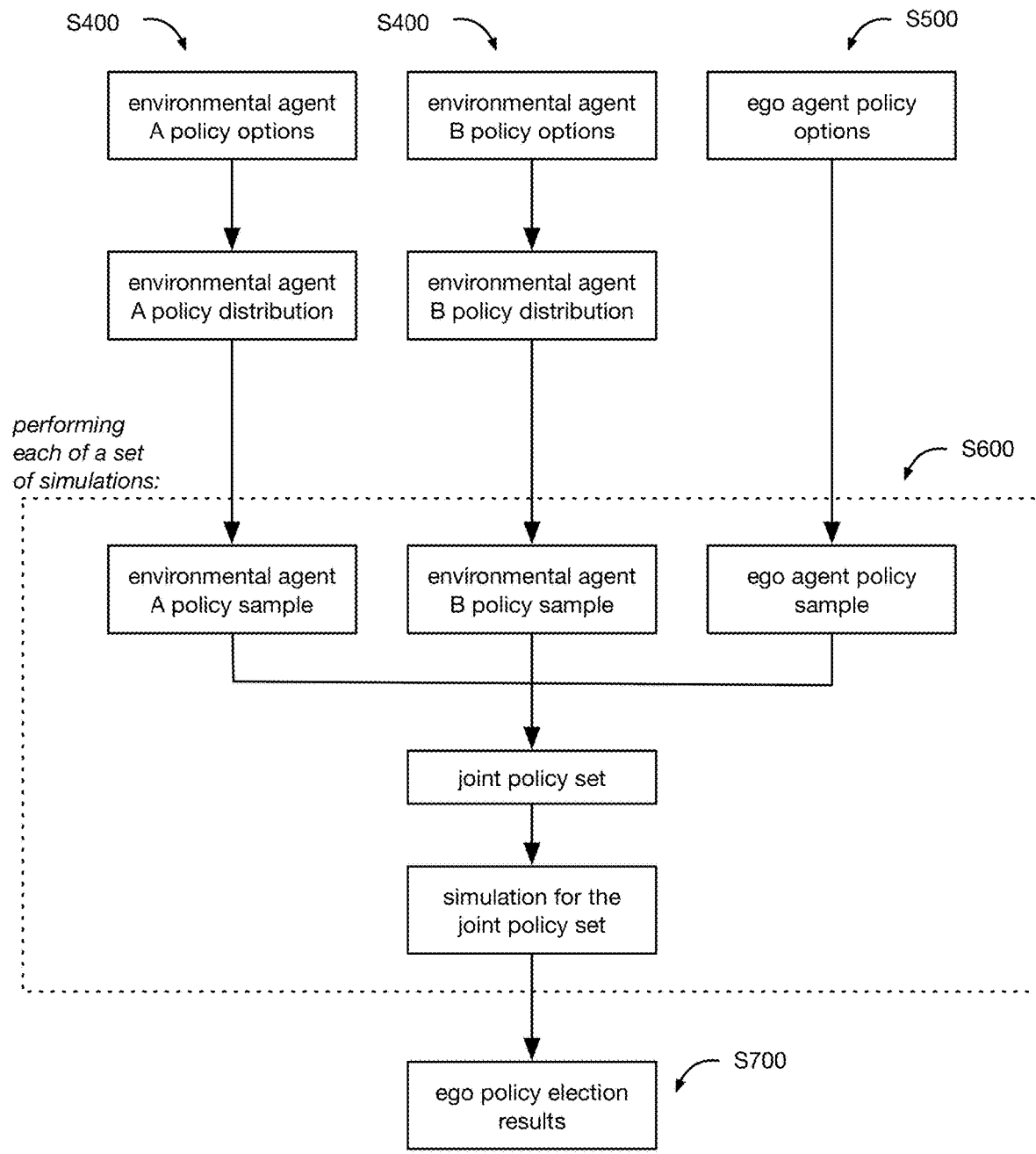
FIGS. 11A and 11B are schematic representations of examples of selecting an ego agent policy.
Figure 11B:
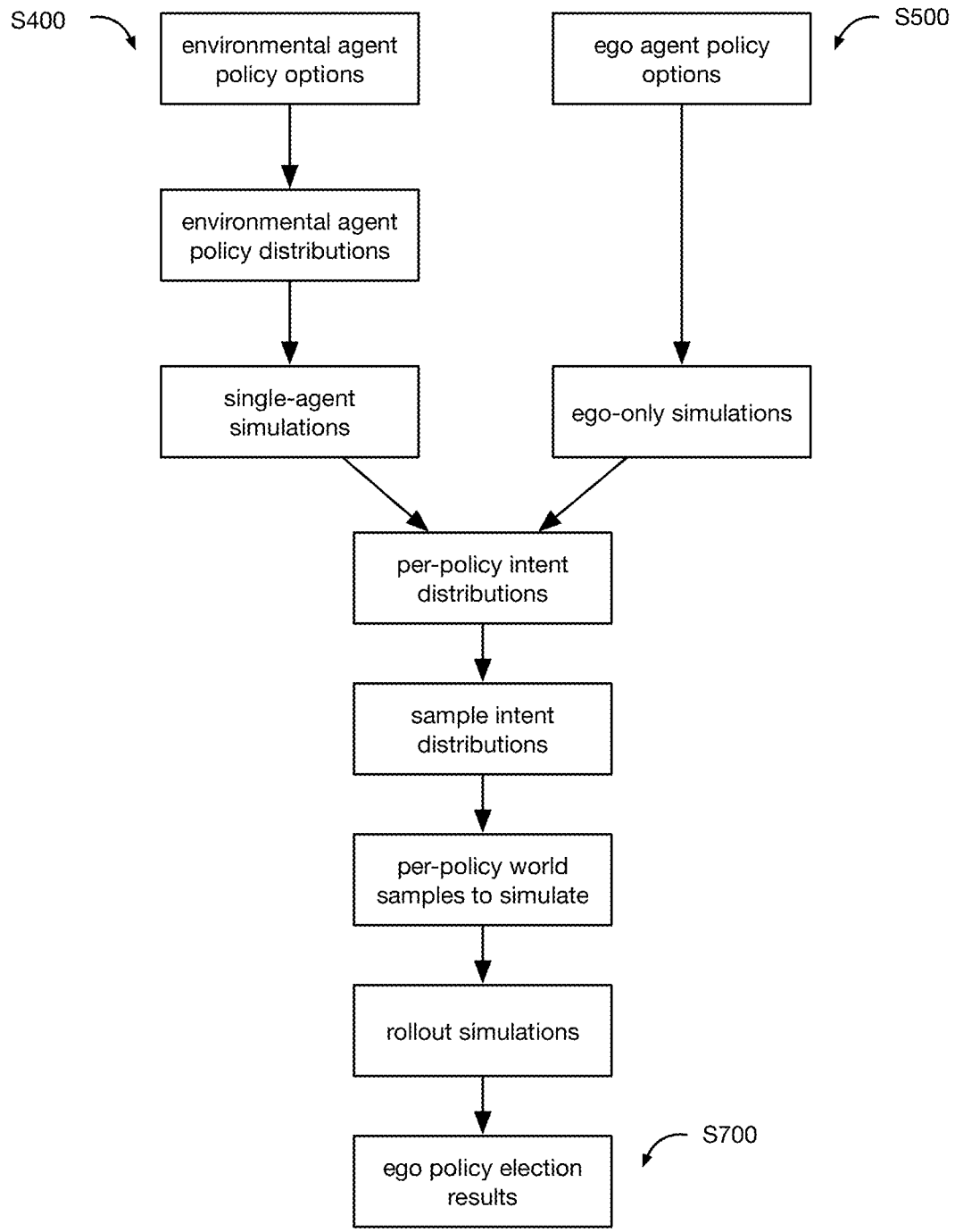

Evaluating a hypothesis can include determining a probability associated with the hypothesis (e.g., a probability the hypothesis is true, a confidence associated with a determination, etc.). The probability of a hypothesis (e.g., a child hypothesis) can be determined based on: a parent hypothesis (e.g., computing a conditional probability), the probability of a parent hypothesis, a decision model, a set of priors (e.g., global priors such as how often do people cross streets), decisioning data (e.g., kinematics data), global probabilities (e.g., a global probability for the heading of a vehicle remaining constant), and/or a combination thereof. Examples are shown in FIG. 9A and FIG. 9B. In a specific example, as the intent estimation model is built and/or traversed, probability can optionally be distributed among each evaluated hypothesis, such that each child hypothesis has a probability less than or equal to its parent hypothesis, and the sum of the probabilities of all child hypotheses add to the probability of the parent hypothesis.

A decision model used to generate a set of hypotheses and/or used to determine the probability of a hypothesis can be determined (e.g., selected) based on: the decision associated with the hypothesis, the hypothesis itself, a parent hypothesis (e.g., the direct parent and/or an ancestor), a combination thereof, and/or any other information. In an example, a decision can be associated with one or more decision models (e.g., at least one, at least two, at least three, etc.). In a specific example, a decision model can optionally be selected from a set of decision models associated with a child decision based on the parent hypothesis for the child decision. In an illustrative example, the parent decision is an agent classification, wherein the set of parent hypotheses includes a vehicle classification and a pedestrian classification; the child decision can be associated with a first decision model and a second decision model, wherein the first decision model corresponds to the vehicle classification (e.g., the first decision model is selected when 'vehicle classification' is the parent hypothesis) and the second decision model corresponds to the pedestrian classification (e.g., the second decision model is selected when 'pedestrian classification' is the parent hypothesis). In a another illustrative example, for a response to ego agent decision, a decision model associated with a pedestrian classification (e.g., selected when 'pedestrian classification' is the parent hypothesis) is a binary model, modeling whether the environmental agent will stop for the ego agent as a binary classification (e.g., when the pedestrian environmental agent has the right of way, it is assumed that the pedestrian environmental agent will not stop); and a decision model associated with a vehicle classification (e.g., selected when 'vehicle classification' is the parent hypothesis) is a non-binary model (e.g., a sigmoid probability model), modeling a probability that the environmental agent will stop for the ego agent.

Decisioning data used to determine the probability of a hypothesis (e.g., used as input into the decision model) can be determined (e.g., selected from a superset of decisioning data collected in S100) based on: the decision model, the hypothesis itself, a parent hypothesis (e.g., the direct parent and/or an ancestor), a combination thereof, and/or any other information. For example, a subset of decisioning data can be selected for evaluating a set of hypotheses for a decision. In a specific example, generating an intent estimation model (e.g., tree model) for an environmental agent (e.g., for each environmental agent in a set) can include, for each decision of the set of decisions: selecting a subset of the decisioning data based on the decision; and, using a model associated with the decision, determining a probability for each of a set of hypotheses for the decision based on the subset of the decisioning data.

In variants, the output of S300 can include one or more hypothesized states of the agent, and optionally a probability for each hypothesized state. A hypothesized state can include a set of multiple hypotheses (e.g., forming a branch of the intent estimation model, from a root node to a leaf node). In an illustrative example, a first hypothesized state includes: vehicle+starting edge B+route C+will not yield to ego agent+speeding up; and a second hypothesized state includes vehicle+starting edge A+route A+will yield to ego agent+slowing down. For example, a hypothesized state can include the hypothesis of a leaf node (e.g., terminal node) of the intent estimation model and all hypotheses of the respective parent nodes. The hypothesized state can be used to determine (e.g., define, map to, etc.) one or more environmental agent policies.

In variants, S300 can be performed for one or more environmental agents, which can include any or all of the environmental agents identified in S200. Additionally or alternatively, S300 can be performed for the ego agent, and/or any other agent. For example, an intent estimation model can be generated for each environmental agent in a set of environmental agents. In a first set of examples, S300 is performed for a single target agent, and can be repeated for further target agents (e.g., iteratively, in parallel, etc.). A per-agent intent estimation model 300 evaluates a set of hypotheses for the target agent. In a second set of examples, S300 is performed jointly for multiple agents. A joint intent estimation model 300 determines hypotheses pertaining to the multiple agents (e.g., in the same node, in connected nodes, etc.), and/or considers joint probabilities associated with the states of the multiple agents (e.g., taking into account interplays and/or dependencies between agents).

Figure 3:
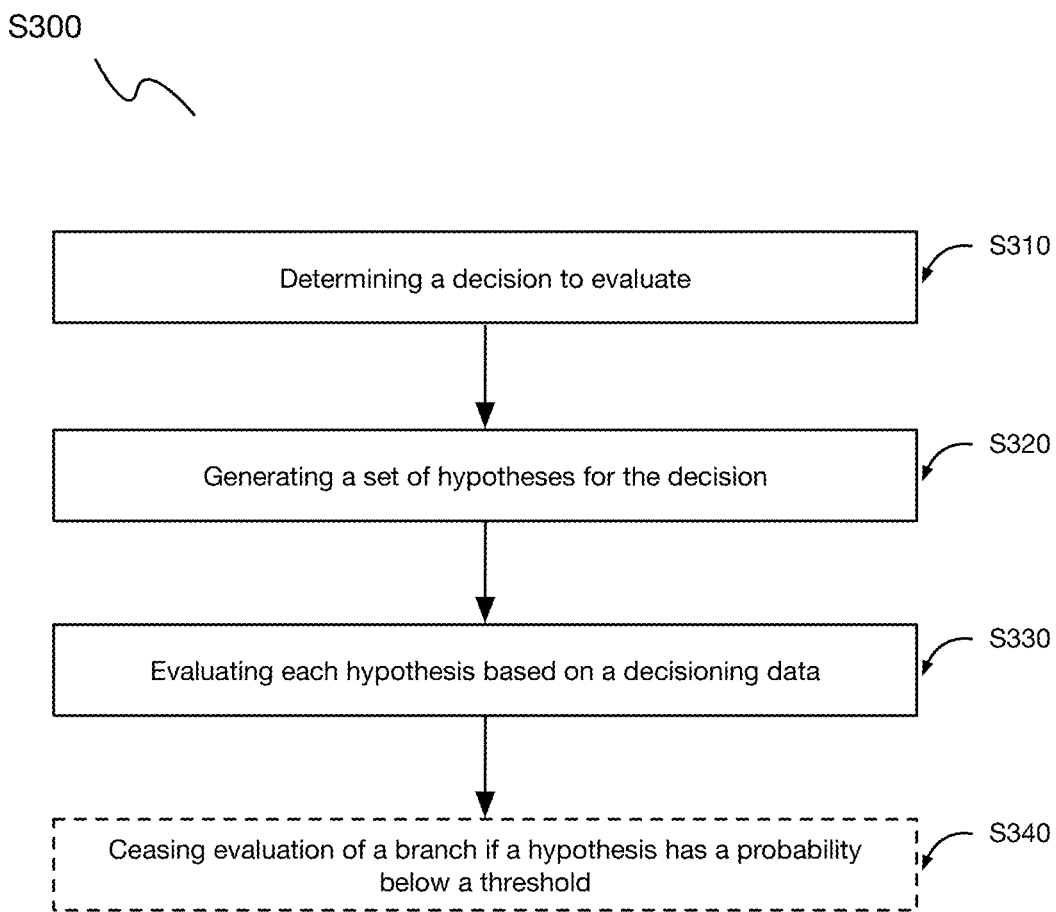
FIG. 3 is a schematic representation of a variant of evaluating a set of hypotheses for an environmental agent.

In variants, S300 can include: determining a decision to evaluate S310, generating a set of hypotheses for the decision S320, evaluating each hypothesis based on decisioning data S330, optionally ceasing evaluation of a branch if a hypothesis has a probability below a threshold S340, and/or any other suitable steps (e.g., example shown in FIG. 3). Each of the steps of S300 can optionally be performed iteratively (e.g., such that the various nodes in branches of the tree-based model are iteratively considered as you "go down" the branches of nodes). Additionally or alternatively, a batch of (e.g., all) decisions to be evaluated, their order, and/or their respective hypotheses are determined prior to evaluating the respective hypotheses. Optionally, a subset of the predetermined batch of decisions and/or associated hypotheses are not evaluated (e.g., a branch is pruned) if it is determined that a hypothesis for a particular branch of the model satisfies one or more criterion or fails to satisfy one or more criterion (e.g., evaluation of a branch ceases if: the hypothesis has a probability below a threshold value, the hypothesis includes the environmental agent moving away from the ego agent, the hypothesis includes the environmental agent is further than a threshold distance from the ego agent, etc.)

Determining a decision to evaluate S310 can function to determine an order in which decisions are evaluated. S310 can optionally include selecting a hypothesis to expand and expanding the hypothesis, which can include, after a hypothesis is evaluated, determining a decision to evaluate that branches the hypothesis. Selecting a hypothesis to expand preferably includes selecting the hypothesis or a set of hypotheses (e.g., if multiple hypotheses are evaluated in parallel) with the highest probability, with subsequent hypotheses expanded in order of relatively highest probability. However, hypotheses can be explored in any other suitable order (e.g., based on a risk level associated with a hypothesis, based on a prioritization associated with hypotheses, etc.).

Determining a decision to evaluate (e.g., the first decision to evaluate for an agent, each subsequent decision, etc.) can be based on a predetermined order, a dynamic order, a randomized order, a set of criteria (e.g., maximizing information gain, minimizing entropy, etc.), based on one or more previously evaluated hypotheses (e.g., the hypothesis from which the decision stems, higher-level hypotheses, etc.), based on one or more previously evaluated decisions, based on a probability associated with one or more previously evaluated decisions, a set of available decisioning data, and/or any other suitable factors. For example, the method can optionally include, for a given parent hypothesis, selecting a child decision from a set of available decisions to generate a set of child hypotheses, wherein the set of available decisions can be: predetermined (e.g., defined by the order of decisions), determined based on a parent decision (associated with the parent hypothesis), determined based on a parent hypothesis (e.g., the direct parent hypothesis or an ancestor hypothesis), determined based on decisioning data, and/or otherwise determined. For example, the method may evaluate a set of decisions including "pedestrian subclass" and/or "jaywalker?" if the decision depends on a parent hypothesis (e.g., has a parent node) that the environmental agent is a pedestrian, but not if the decision depends on a parent hypothesis that the environmental agent is a vehicle.

In variants, a decision can be selected to evaluate to maximize information gain, which can reduce a time and/or computational load associated with evaluating the set of hypotheses by reducing a set of available hypotheses. In an example, evaluating a decision of "agent type" prior to evaluating a decision of "agent's route" may reduce the number of potential route hypotheses considered in the intent estimation model, as vehicles and pedestrians combined have a greater number of potential routes than only vehicles or only pedestrians.

Generating a set of hypotheses for the decision S320 can function to determine a set (e.g., two or more) of possible outcomes of the decision. In variants, S320 can include retrieving one or more hypotheses from a set of predetermined hypotheses stored in association with the decision (e.g., from a database, lookup table, etc.). In an example, a decision of agent type can map to a predetermined set of hypotheses (e.g., vehicle and pedestrian). Additionally or alternatively, S320 can include dynamically generating a set of one or more hypotheses (e.g., based on decisioning data, using a decision model, etc.), and optionally selecting one or more hypotheses from the set. In an example, a starting edge decision (e.g., a vehicle lane decision) can include determining all available starting edges (e.g., lanes) based on decisioning data (e.g., vision data, map data, etc.), and optionally determining only a subset of the starting edges to propose as hypotheses.

Evaluating each hypothesis based on decisioning data S330 can function to determine a probability associated with a hypothesis representing a potential outcome of a decision. In an example, the decisioning data can include sensor data (e.g., camera data) and/or evidence determined based on sensor data (e.g., velocity, right of way determination, distance to the ego agent, environmental agent overlap with a lane, etc.).

In an example, the probability is determined using a decision model (equivalently referred to herein as an evaluation model). The probability can optionally be a conditional probability associated with a parent hypothesis. In examples, this can include determining the probability of a child hypothesis (e.g., agent type=pedestrian) given a parent hypothesis (e.g., agent detected on sidewalk).

In variants, S330 can optionally include determining a decision model (e.g., a specific decision model, a decision model type, etc.) to use to evaluate each hypothesis (e.g., based on the hypothesis type, based on available decisioning data, etc.). Different hypotheses in the intent estimation model can optionally be evaluated with different decision model types. Decision models can include statistical models, trained models (e.g., learning models, machine learning models, deep learning models, neural networks, etc.), physics-based models (e.g., dynamic equations, static equations, energy conservation principles, etc.), any of the models disclosed in in U.S. application Ser. No. 16/514,624, filed 17 Jul. 2019, and/or U.S. application Ser. No. 17/365,538, filed 1 Jul. 2021, each of which is incorporated herein in its entirety by this reference, any other suitable model, and/or combinations thereof.

In variants, S330 can optionally further include selecting decisioning data to use to evaluate the hypothesis. Decisioning data can include or be determined based on: decisioning data used to evaluate a higher-level hypothesis and/or decisioning data not yet used to evaluate a higher-level hypothesis. Decisioning data can be selected based on the decision model, based on the hypothesis (e.g., specific hypotheses can be evaluated with a prescribed set of decisioning data), based on a health parameter associated with one or more of the decisioning data sources, and/or any other criteria. In specific examples, an agent class can be determined based on decisioning data from a vision system (e.g., camera), while a hull shape can be determined based on decisioning data from LiDAR. In a first example, evaluation of certain hypotheses (e.g., motion hypotheses such as heading, trajectory velocity, etc.) can be determined using data from current and prior time iterations (e.g., past 4 seconds, past 3 seconds, past 2 seconds, past second, any interval therebetween, etc.). In a second example, evaluation of certain hypotheses (e.g., starting edge), can be determined using (only) data from a most recent time iteration.

In variants, S330 can optionally further include updating a higher-level hypothesis (e.g., a prior hypothesis) based on decisioning data (e.g., Bayesian hypothesis testing) not used during the evaluation of the higher-level hypothesis, and/or the outcome of a lower-level hypothesis. In a specific example, a higher-level hypothesis (e.g., agent class=vehicle) is evaluated using decisioning data from a first source (e.g., a vision system) and found to have a first probability, and later (or in parallel) the first probability can be updated using decisioning data from a second source (e.g., a radar) and/or a second probability associated with a lower-level hypothesis (e.g., a 95% probability that the agent is traveling above 50 mph), thereby modifying (e.g., increasing) the first probability.

Ceasing evaluation of a branch if a hypothesis has a probability below a threshold S340 can function to reduce an overall quantity of hypotheses evaluated by the method 100, which can confer the further advantage of reducing an overall quantity of environmental agent policy options determined at S400, thereby increasing a likelihood that a high probability environmental agent policy is evaluated (e.g., simulated) at S600. In some examples, due to inherent latency limitations of the computing systems performing the method (e.g., onboard processors, networks through which data is passed, etc.), coupled with the high-speed requirements for live decision-making for autonomous agents, only a finite quantity of hypotheses and/or policy combinations can be evaluated before a policy must be selected for the ego agent to execute. In variants, it can be advantageous to simulate as many high-probability policy combinations as possible to ensure the most optimal (e.g., safest, least disruptive, etc.) policy is selected for the ego vehicle.

S340 can optionally include terminating evaluation of a branch (e.g., pruning) of the tree/intent estimation model at a node when a set of one or more hypotheses associated with the node (e.g., at S330, collectively, when aggregated, etc.) satisfies one or more criteria or fails to satisfy one or more criteria. For example, S340 can include terminating evaluation of a branch at a node when a probability associated with a set of one or more hypotheses associated with the node satisfies the one or more criteria or fails to satisfy the one or more criteria. In variants, the probabilities can be associated with a single node (e.g., a terminal node, wherein evaluation ceases at the node without generating and/or evaluating potential children of the node), a node and its children (e.g., wherein evaluation ceases at a parent node if all children have too low a probability), a node and a subset of its parents, and/or any other combination of nodes. In a first example, when the probability of a hypothesis is evaluated to have a probability below a threshold (e.g., <10%, <1%, <0.1%, <0.01%, <0.001%, etc.), the branch can be pruned (e.g., evaluation of the branch ceases). In a second example, a branch can be pruned if the hypothesis is low priority and/or low risk (e.g., if the hypothesis includes the environmental agent moving away from the ego agent, if the hypothesis includes the environmental agent is greater than a threshold distance from the ego agent, if the hypothesis includes the environmental agent is behind the ego agent, a combination thereof, etc.). In a third example, the branch can be pruned after all potential hypotheses have been evaluated. In a fourth example, the branch can be pruned after a time limit has been reached. In a fifth example, the branch can be pruned after a threshold number of iterations has been reached. Additionally or alternatively, S300 can include any other processes and/or be otherwise suitably performed.

5.4 Method—Determining a Set of Environmental Agent Policy Options Based on the Set of Hypotheses S400

The method 100 can optionally include determining a set of environmental agent policy options (e.g., a first set of policy options) based on the set of hypotheses S400, which can function to determine one or more policies that describe a current and/or future state of one or more of the environmental agents. Policies can function to prescribe how an agent will act (e.g., its behavior, its trajectory, etc.) in a simulation predicting its future states.

An environmental agent policy can optionally be determined based on one or more hypothesized states determined in S300. Preferably, one hypothesized state is used to determine one policy, but alternatively one hypothesized state can be used to determine multiple policies, or multiple hypothesized states can be used to determine a single policy. In a first embodiment, S400 is performed for all hypothesized states (e.g., all leaf nodes) determined in S300. In a second embodiment, S400 is performed for all hypothesized states with a probability (e.g., the probability of its terminal node) satisfying a criterion (e.g., exceeding a threshold value). In a third embodiment, but S400 can be performed for a subset (e.g., a sample) of all hypothesized states with a probability (e.g., the probability of its terminal node) satisfying a criterion. The environmental agent policy can optionally be associated with the probability of the associated hypothesized state (e.g., the probability of the leaf node). In an example, an environmental agent policy can be a controller (e.g., a deterministic controller) with a set of parameters determined based on the hypothesized state (e.g., based on the constituent hypotheses in the hypothesized state).

In a first variant, a complete policy is defined by a hypothesized state. For example, the environmental agent policy can be defined by the hypotheses of a hypothesized state. In a specific example, each environmental agent policy option in the set of environmental agent policy options is defined by a branch of the intent estimation model (e.g., a branch that was not pruned during S340), wherein the branch includes a set of hypotheses. In a second variant, determining an environmental agent policy option comprises retrieving the policy from a set of predetermined policy options based on the hypothesized state(s). In examples, S400 can include mapping a hypothesized state to a policy option, applying an inference model that accepts the hypothesized state as input to output a predicted policy, retrieving a policy using a lookup method comprising one or more of the hypotheses of the hypothesized state, and/or otherwise retrieving the environmental agent policy option. In a third variant, determining a set of environmental agent policy options comprises dynamically determining a policy (e.g., using a trained machine learning model) based on the hypothesized state(s).

Additionally or alternatively, S400 can include any other processes and/or be otherwise suitably performed.

5.5 Method—Determining a Set of Ego Agent Policy Options S500

The method 100 can optionally include determining a set of ego agent policy options (e.g., a second set of policy options) S500, which can function to identify a set of potential behavioral policies (e.g., a feasible set) for execution by the autonomous agent. In examples, S500 can output a plurality of potential behavioral policies having a highest probability (e.g., exceeding a threshold safety score) of being executed by the autonomous agent.

In a preferred set of variants, determining any or all of the set of ego agent policy options are performed within (e.g., during, as part of, etc.) a multi-policy decision-making process (e.g., as described above, as implemented during a planning cycle of the ego agent, etc.), such any or all of those described in U.S. application Ser. No. 16/514,624, filed 17 Jul. 2019, and/or U.S. application Ser. No. 17/365,538, filed 1 Jul. 2021, each of which is incorporated herein in its entirety by this reference.

In a set of examples, for instance, a set of ego agent policy options are fully or partially retrieved from a set of predetermined ego agent policy options based on a score (e.g., probability of execution) associated with each policy option. The score can be determined based on a set of decisioning data (e.g., the same and/or different as the decisioning data used in S200). In variants, determining any or all of the set of ego agent policy options can be performed before, after, or concurrently with (e.g., in parallel with, dependent on, etc.) determining the set of environmental agent policy options S400. Additionally or alternatively, any or all of the ego agent policies can be dynamically produced, dynamically selected, and/or determined in any other ways or any combination of ways.

In a first variant, determining the set of ego agent policy options can be performed independently of determining the set of environmental agent policy options.

In a second variant, the set of ego agent policy options can be determined based on one or more of the current and/or projected environmental agent policies determined in S400. In an example, a potential ego agent policy option can be excluded if the policy would result in a collision with an environmental agent acting under a high likelihood environmental agent policy.

In a third variant, the set of ego agent policy options can be determined based on a set of probabilities associated with one or more of the set of hypotheses (e.g., intermediate probabilities in the tree). In an example, a potential ego agent policy option can be excluded if determined to have a score exceeding a threshold (e.g., a high-risk parameter value), wherein the score is determined based on one of the intermediate probabilities.

Additionally or alternatively, S500 can include any other processes and/or be otherwise suitably performed.

5.6 Method—Evaluating the Set of Environmental Agent Policy Options and/or the Set of Ego Agent Policy Options S600

The method 100 can optionally include evaluating the set of environmental agent policy options and/or the set of ego agent policy options S600, which can function to evaluate a predicted performance of the set of environmental agent policy options and/or the set of ego agent policy options. Additionally or alternatively, S600 can function to sample sets of joint policies, each including a subset of environmental agent policy options and a subset of ego agent policy options; predict (e.g., simulate) an outcome of each joint policy; and/or otherwise function. S600 can be performed after S400 and S500, or concurrently with S400 and/or S500 (e.g., wherein sampling and simulation of policies commences prior to generation of all potential policies) if a condition (e.g., a high probability threshold, etc.) is satisfied.

S600 can include sampling one or more environmental agent policy options produced at S400, and sampling one or more ego agent policy options produced at S500 to produce a joint policy set. Additionally or alternatively, S600 can include sampling one or more hypothesized states with a probability exceeding a threshold value prior to generating an associated policy at S400. Sampling (e.g., random sampling) is preferably performed according to one or more criteria, such as ensuring that all of the N (e.g., N=1, 2, 3, 5, 10, etc.) highest likelihood policies for each environmental agent and each ego agent are sampled at least X times (e.g., X=1, 2, 3, 5, 10, etc.), ensuring all of the environmental agent policies with a probability above a threshold are sampled at least once, preventing mutually exclusive policies from being assigned (e.g., position of two pedestrians cannot be overlapping at next time frame), and/or any other criterion. In a specific example, S600 can include sampling from the set of environmental agent policy options for an environmental agent according to a probability distribution of the set of environmental agent policy options, wherein the probability distribution is determined based on a probability for each environmental agent policy option (e.g., as determined based on the tree model), and simulating the sampled environmental agent policy options. However, sampling can be performed randomly and/or otherwise performed. In variants, sampling policies can be performed for a single environmental agent at a time (e.g., in parallel, serially, etc.), or for multiple agents at a time (e.g., sample policies based on the joint likelihoods of policies of multiple environmental agents).

S600 can include simulating a joint policy set (e.g., examples shown in FIG. 6A, FIG. 6B, FIG. 11A, and FIG. 11B). For example, simulating a joint policy set can include predicting, based on their respective assigned policies, the behavior and/or interactions of each environmental agent and ego agent in a scene at one or more future points in time, and computing a set of scores based on the simulation (e.g., a likelihood that each agent is performing the assigned policy, a safety score, etc.).

In examples, simulating the joint policy set can be performed using a multi-policy decision-making process, and/or any other suitable process. In a specific example, the simulations can be run on a per-policy basis for samples selected from a probability distribution for the environmental representation of the ego vehicle. Per-policy world samples can be simulated in parallel, and the sample rollouts can be analyzed (e.g., in parallel and/or in aggregate) in S700 in order to determine a policy election.

Additionally or alternatively, evaluating the set of environmental agent policy options and/or the set of ego agent policy options (e.g., the joint policy set) can include simulating one or more prior time intervals based on the assigned policies of one or more of the agents, and comparing the predicted behavior to an actual dataset from the one or more prior time intervals (e.g., past decisioning data), and computing a set of scores based on the comparison. In an example, if an assigned policy (e.g., environmental vehicle maintaining constant velocity within lane) would have arisen based on a simulated past trajectory, the simulated past trajectory can be compared to an actual past trajectory (as determined by the actual dataset) and an accuracy score can be assigned to the assigned policy.

Additionally or alternatively, S600 can include any other processes and/or be otherwise suitably performed.

5.7 Method—Selecting an Ego Agent Policy Based on the Evaluation S700

The method 100 can include selecting an ego agent policy based on the evaluation S700 (e.g., examples shown in FIGS. 6A and 6B), which can function to select one of the potential ego agent behavioral policies based on a set of selection criteria (e.g., one or more predetermined or dynamic selection criteria). Additionally or alternatively, S700 can function to control the ego agent (e.g., an autonomous vehicle) according to the selected policy, and/or otherwise function.

In a preferred set of variants, selecting an ego agent policy based on the evaluation is performed within (e.g., during, as part of, etc.) a multi-policy decision-making process (e.g., as described above, as implemented during a planning cycle of the ego agent, etc.), such any or all of those described in U.S. application Ser. No. 16/514,624, filed 17 Jul. 2019, and/or U.S. application Ser. No. 17/365,538, filed 1 Jul. 2021, each of which is incorporated herein in its entirety by this reference.

In a examples, selecting the ego agent policy can include producing a set of scores for each of the set of ego agent policies simulated in S600, and selecting a policy from the set of ego agent policies based on the set of scores. In a specific example, for an ego agent policy simulated with a set of environmental agent policies in S600, a score for the ego agent policy can be determined based on the probability for each simulated environmental agent policy (e.g., a risk score of an ego agent policy can be determined based on the probability of each environmental agent policy). In examples, S700 can include selecting a policy with a highest probability of being implemented without collision, a policy that maximizes an objective across the set of simulations evaluated in S600, a policy that minimizes displacement of the other environmental agents, and/or any other suitable objective.

Additionally or alternatively, S700 can include any other processes and/or be otherwise suitably performed.

However, the method can be otherwise performed.

6. Specific Examples

A numbered list of specific examples of the technology described herein are provided below. A person of skill in the art will recognize that the scope of the technology is not limited to and/or by these specific examples.

Specific Example 1. A method, comprising: collecting data from a set of sensors onboard an autonomous vehicle; identifying an environmental agent in an environment of the autonomous vehicle; generating a tree model based on a set of decisions, the tree model comprising nodes representing hypotheses for the environmental agent, wherein generating the tree model comprises: for a parent decision in the set of decisions: using a decision model associated with the first decision, determining a probability for each of a set of parent hypotheses for the parent decision based on a first subset of the data; and for a child decision in the set of decisions: for each parent hypothesis in the set of parent hypotheses: using a decision model associated with the child decision, determining a probability for each of a set of child hypotheses for the child decision based on a second subset of the data; determining a set of environmental agent policy options for the environmental agent based on the tree model; performing a set of simulations based on the set of environmental agent policy options and a set of ego agent policy options for the autonomous vehicle; and selecting an ego agent policy for the autonomous vehicle based on the set of simulations.

Specific Example 2. The method of Specific Example 1, wherein, for each parent hypothesis in the set of parent hypotheses, the probability for each of the set of child hypotheses is further determined based on the probability for the parent hypothesis.

Specific Example 3. The method of any of Specific Examples 1 or 2, wherein, for each parent hypothesis in the set of parent hypotheses, the decision model associated with the child decision is selected based on the parent hypothesis.

Specific Example 4. The method of Specific Example 3, wherein the parent decision comprises an agent classification, wherein the set of parent hypotheses comprises a vehicle classification and a pedestrian classification, wherein the child decision is associated with a first decision model for the child decision and a second decision model for the child decision, wherein the first decision model for the child decision corresponds to the vehicle classification and the second decision model for the child decision corresponds to the pedestrian classification.

Specific Example 5. The method of any of Specific Examples 1-4, wherein each environmental agent policy option in the set of environmental agent policy options is defined by a branch of the tree model comprising a set of hypotheses.

Specific Example 6. The method of Specific Example 5, wherein performing the set of simulations comprises sampling from the set of environmental agent policy options according to a probability distribution of the set of environmental agent policy options, wherein the probability distribution is determined based on a probability for each environmental agent policy option.

Specific Example 7. The method of any of Specific Examples 1-6, wherein the set of parent hypotheses for the parent decision are predetermined.

Specific Example 8. The method of Specific Example 7, wherein the set of child hypotheses for the child decision are determined based on the data.

Specific Example 9. The method of any of Specific Examples 1-8, wherein the set of decisions comprise at least: an agent classification decision, a route decision, an environmental agent response to the autonomous vehicle decision, and an acceleration decision.

Specific Example 10. The method of any of Specific Examples 1-9, wherein a decision in the set of decisions comprises a jaywalking decision.

Specific Example 11. The method of any of Specific Examples 1-10, further comprising operating the autonomous vehicle according to the selected ego agent policy.

Specific Example 12. A system, comprising: a set of sensors onboard an autonomous vehicle; and a processing system in communication with the set of sensors, wherein the processing system is configured to: collect environmental data from the set of sensors; identify a set of environmental agents in an environment of the autonomous vehicle based on the environmental data; generate a tree model for each environmental agent in the set of environmental agents based on a set of decisions, the tree model comprising nodes representing hypotheses for the environmental agent, wherein generating the tree model for comprises, for each decision of the set of decisions: selecting a subset of the environmental data based on the decision; and using a model associated with the decision, determining a probability for each of a set of hypotheses for the decision based on the subset of the environmental data; determine a set of environmental agent policy options for each environmental agent in the set of environmental agents based on the generated tree model for the environmental agent; perform a set of simulations based on the set of environmental agent policy options for each environmental agent and a set of ego agent policy options for the autonomous vehicle; select an ego agent policy for the autonomous vehicle based on the set of simulations; and implement operation of the vehicle according to the selected policy.

Specific Example 13. The system of Specific Example 12, wherein, for each environmental agent, an environmental agent policy option in the set of environmental agent policy options is defined by a branch of the tree model comprising a set of hypotheses.

Specific Example 14. The system of Specific Example 13, wherein performing the set of simulations comprises sampling from the set of environmental agent policy options according to a probability distribution of the set of environmental agent policy options, wherein the probability distribution is determined based on a probability for each environmental agent policy option.

Specific Example 15. The system of any of Specific Examples 12-14, wherein the hypotheses for the environmental agent comprises hypotheses for a current state of the environmental agent and hypotheses for a predicted future state of the environmental agent.

Specific Example 16. The system of any of Specific Examples 12-15, wherein the set of decisions comprise at least: an agent classification decision, a route decision, an environmental agent response to the autonomous vehicle decision, and an acceleration decision.

Specific Example 17. The system of any of Specific Examples 12-16, wherein a decision in the set of decisions comprises an environmental agent response to the autonomous vehicle decision.

Specific Example 18. The system of Specific Example 17, wherein a first hypothesis for the environmental agent response to the autonomous vehicle decision comprises: the environment agent will yield to the autonomous vehicle, wherein a second hypothesis for the environmental agent response to the autonomous vehicle comprises: the environment agent will not yield to the autonomous vehicle.

Specific Example 19. The system of any of Specific Examples 12-18, wherein the tree model comprises a Bayesian decision tree.

Specific Example 20. The system of any of Specific Examples 12-19, wherein the processing system is located onboard the autonomous vehicle.

As used herein, "substantially" or other words of approximation (e.g., "about," "approximately," etc.) can be within a predetermined error threshold or tolerance of a metric, component, or other reference (e.g., within +/−0.001%, +/−0.01%, +/−0.1%, +/−1%, +/−2%, +/−5%, +/−10%, +/−15%, +/−20%, +/−30%, any range or value therein, of a reference).

All references cited herein are incorporated by reference in their entirety, except to the extent that the incorporated material is inconsistent with the express disclosure herein, in which case the language in this disclosure controls.

Different subsystems and/or modules discussed above can be operated and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPU, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A method, comprising:
   collecting data from a set of sensors onboard an autonomous vehicle;
   identifying an environmental agent in an environment of the autonomous vehicle;
   generating a tree model based on a set of decisions, the tree model comprising nodes representing hypotheses for the environmental agent, wherein generating the tree model comprises:
      for a parent decision in the set of decisions: using a parent decision model associated with the parent decision, determining a probability for each of a set of parent hypotheses for the parent decision based on a first subset of the data; and
      for a child decision in the set of decisions: for each parent hypothesis in the set of parent hypotheses: using a child decision model associated with the child decision, determining a probability for each of a set of child hypotheses for the child decision based on a second subset of the data;

determining a set of environmental agent policy options for the environmental agent based on the tree model, wherein each environmental agent policy option in the set of environmental agent policy options is defined by a branch of the tree model comprising a set of hypotheses;

performing a set of simulations based on the set of environmental agent policy options and a set of ego agent policy options for the autonomous vehicle, wherein performing each simulation in the set of simulations comprises:

selecting an ego agent policy option from the set of ego agent policy options;

selecting an environmental agent policy option from the set of environmental agent policy options, wherein a probability of selecting the environmental agent policy option is determined based on a probability distribution of the set of environmental agent policy options, the probability distribution determined based on the tree model;

simulating the ego agent policy option and the environmental agent policy option as a joint policy set;

selecting an ego agent policy for the autonomous vehicle based on the set of simulations; and operating the autonomous vehicle according to the selected ego agent policy.

2. The method of claim 1, wherein, for each parent hypothesis in the set of parent hypotheses, the probability for each of the set of child hypotheses is further determined based on the probability for the parent hypothesis.

3. The method of claim 1, wherein, for each parent hypothesis in the set of parent hypotheses, the child decision model associated with the child decision is selected based on the parent hypothesis.

4. The method of claim 3, wherein the parent decision comprises an agent classification, wherein the set of parent hypotheses comprises a vehicle classification and a pedestrian classification, wherein the child decision is associated with a first child decision model for the child decision and a second child decision model for the child decision, wherein the first child decision model for the child decision corresponds to the vehicle classification and the second child decision model for the child decision corresponds to the pedestrian classification.

5. The method of claim 1, wherein the set of parent hypotheses for the parent decision are predetermined.

6. The method of claim 5, wherein the set of child hypotheses for the child decision are determined based on the data.

7. The method of claim 1, wherein the set of decisions comprise at least: an agent classification decision, a route decision, a decision for an environmental agent response to the autonomous vehicle, and an acceleration decision.

8. The method of claim 1, wherein a decision in the set of decisions comprises a jaywalking decision.

9. A method, comprising:

collecting data from a set of sensors onboard an autonomous vehicle;

identifying an environmental agent in an environment of the autonomous vehicle;

generating a tree model based on a set of decisions, the tree model comprising nodes representing hypotheses for the environmental agent, wherein generating the tree model comprises:

for a parent decision in the set of decisions: using a parent decision model associated with the parent decision, determining a probability for each of a set of parent hypotheses for the parent decision based on a first subset of the data; and for a child decision in the set of decisions: for each parent hypothesis in the set of parent hypotheses: using a child decision model associated with the child decision, determining a probability for each of a set of child hypotheses for the child decision based on a second subset of the data;

determining a set of environmental agent policy options for the environmental agent based on the tree model, wherein each environmental agent policy option in the set of environmental agent policy options is defined by a branch of the tree model comprising a set of hypotheses;

determining a sample of environmental agent policy options selected from the set of environmental agent policy options, wherein the environmental agent policy options in the sample are selected based on a probability distribution of the set of environmental agent policy options, the probability distribution determined based on the tree model, wherein at least one environmental agent policy option is selected multiple times;

for each environmental policy agent option in the sample, performing a simulation;

selecting an ego agent policy for the autonomous vehicle based on the simulations; and operating the autonomous vehicle according to the selected ego agent policy.

* * * * *